US007886046B1

(12) United States Patent
Zeitoun et al.

(10) Patent No.: US 7,886,046 B1
(45) Date of Patent: Feb. 8, 2011

(54) METHODS AND APPARATUS FOR PREDICTING IMPACT OF PROPOSED CHANGES AND IMPLEMENTATIONS IN DISTRIBUTED NETWORKS

(75) Inventors: Amgad Zeitoun, Sunnyvale, CA (US); Muhammad Mukarram Bin Tariq, Atlanta, GA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 12/152,861

(22) Filed: May 16, 2008

(51) Int. Cl.
*G06F 15/17* (2006.01)
(52) U.S. Cl. .................. 709/224; 706/50; 706/56; 370/230.1; 370/241
(58) Field of Classification Search ................ 709/224; 706/50, 56; 370/230.1, 241
See application file for complete search history.

(56) References Cited

U.S. PATENT DOCUMENTS

| 6,597,660 B1 * | 7/2003 | Rueda et al. ............. 370/230.1 |
| 7,490,073 B1 * | 2/2009 | Qureshi et al. ................ 706/50 |
| 2008/0037432 A1 * | 2/2008 | Cohen et al. ................ 370/241 |

OTHER PUBLICATIONS

M. Arlitt, B. Krishnamurthy, J. Mogul. Predicting short-transfer latency from TCP arcana: A trace-based validation. In Proc. IMC'2005: ACM SIGCOMM, USENIX Internet Measurement Conference, Berkeley, CA. Oct. 2005.

L.A. Barroso, J. Dean, U. Holzle. Web Search for a Planet: The Google Cluster Architecture. IEEE Micro.
P. Bahl, R. Chandra, A. Greenberg, S. Kandula, D. Maltz, M. Zhang. Towards Highly Reliable Enterprise Network Services via Inference of Multi-level Dependencies. SIGCOMM 2007.
N. Cardwell, S. Savage, T. Anderson. Modeling TCP Latency. In proc. IEEE Infocomm 2000.
G. Cooper. A Simple Constraint-Based Algorithm for Efficiently Mining Observational Databases for Causal Relationships. Data Mining and Knowledge Discovery 1, 203-224 (1997).
A. Gray, A. Moore, 'N-Body Problems in Statistical Learning. In proc. Avances in Neural Information Processing Systems 13, 2000.
M. Mirza, J. Sommers, P. Barford, X. Zhu. A Machine Learning Approach to TCP Throughout Prediction. ACM Sigmetrics. 2007.

(Continued)

*Primary Examiner*—Kyung-Hye Shin
(74) *Attorney, Agent, or Firm*—Lerner, David, Littenberg, Krumholz & Mentlik, LLP

(57) ABSTRACT

The present invention pertains to specifying, analyzing and evaluating systems such as distributed content distribution networks. Systems and methods are provided to predict how new deployments and changes to existing architectures will impact the networks. A network design may prepare a "what-if" scenario and the impact of this scenario may be predicted. Various tools are provided to determine relevant network variables and collect data about such variables, to learn what dependencies may exist among relevant variables, to prepare an input distribution and to output a predicted impact for the what-if scenario. Thus, a system designer is able to see a predicted impact that a network change or new deployment will have without having to resort to back of the envelope calculation or costly field deployments.

32 Claims, 21 Drawing Sheets

OTHER PUBLICATIONS

J. Dean and S. Ghemawat. MapReduce: Simplified Data Processing on Large Clusters. In Proc. OSDI'04: Sixth Symposium on Operating System Design and Implementation, San Francisco, CA, Dec. 2004.

Lucene Hadoop. http://lucene.apache.org/hadoop/.

H. Madhyastha, T. Anderson, A. Krishnamurthy, N. Spring, A. Venkataramani. A Structural Approach to Latency Prediction. ACM/USENIX Internet Measurements Conference, 2006.

J. Pearl. Causality: Models, Reasoning, and Inference. Cambridge University Press. 2003.

J. Wolberg. Data Analysis Using the Method of Least Squares. Springer. Feb. 2006.

L. Wasserman. All of statistics: A concise course in Statistical Inference. pp. 220-221; 244-245.

Kolmogorov Smirnov Goodness of Fit Test; http://www.itl.nist.gov/div898/software/dataplot/refman1/auxillar/kstest.htm. 5 pages.

* cited by examiner

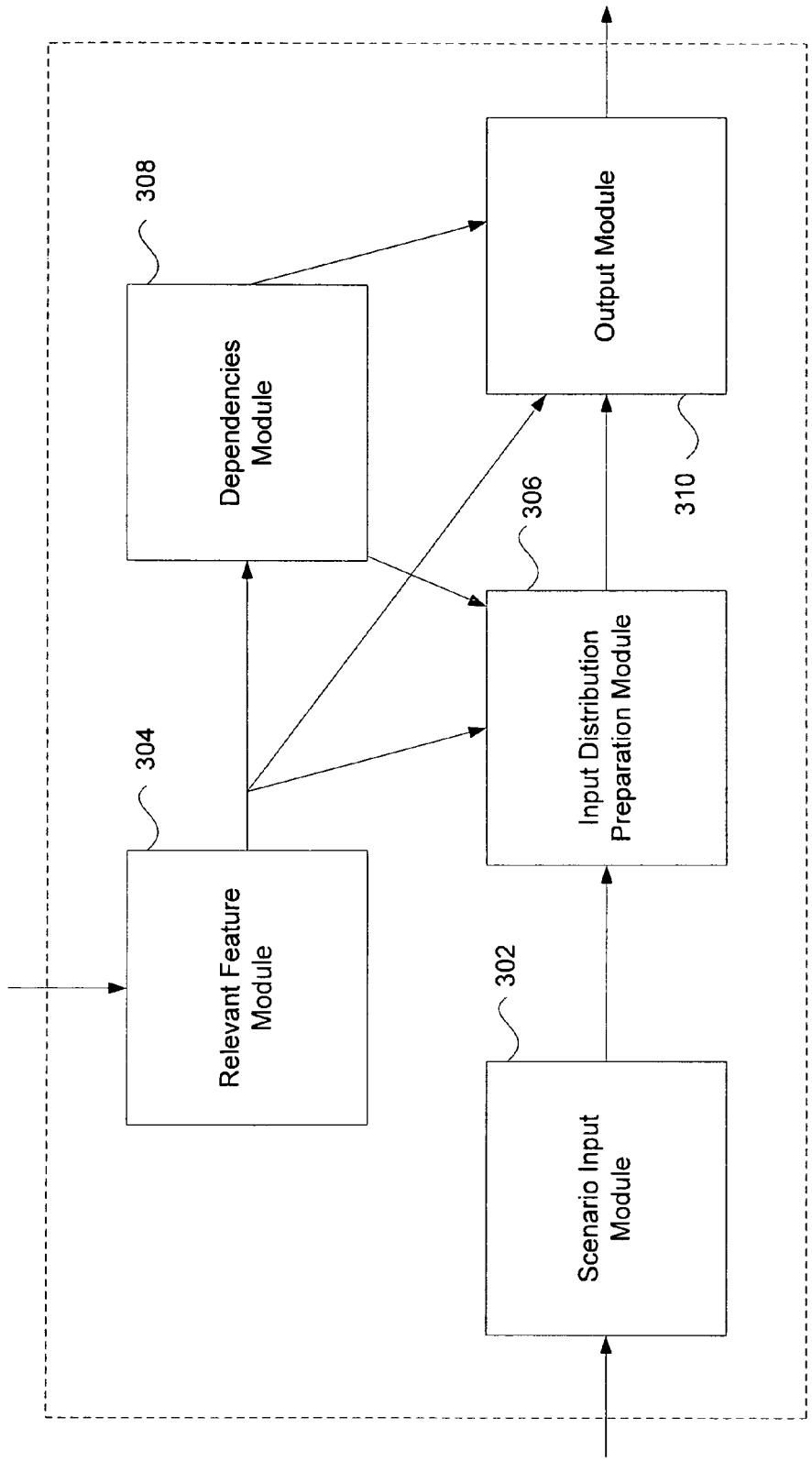

METHODS AND APPARATUS FOR PREDICTING IMPACT OF PROPOSED CHANGES AND IMPLEMENTATIONS IN DISTRIBUTED NETWORKS

BACKGROUND OF THE INVENTION

1. Field of the Invention

The present invention relates generally to predicting the impact and results of new network implementations and proposed changes to existing networks.

2. Description of Related Art

Computer networks are used by companies, governments, schools and other entities to quickly and easily share and access information. Often, computer networks are configured as wide area networks ("WANs") that may be deployed across different buildings, campuses or even countries.

Depending on the size of the entity and its associated growth, a given computer network may be expanded to provide additional capacity or to serve new users. While such growth is desirable, it is often challenging for network designers and operators to estimate how a change in the network will affect existing and future users. It is also possible that a change intended to improve system operation may have unforeseen drawbacks which adversely affect system performance. One important concern is how such changes affect service response time.

Network designers routinely address questions about how specific deployment scenarios affect the response-time of a service. Without a rigorous analytical method for evaluating such scenarios, operators may rely on ad hoc methods, such as anecdotal or rough historical information, to speculate about the performance of a hypothetical deployment scenario.

Network operators may use "back of the envelope" calculations to help guess at the impact that will be created by a new deployment or a change to an existing network configuration. Another solution is to test the change with a field deployment. However, back of the envelope calculations may be inadequate and field testing can often be expensive, time consuming and resource intensive.

Systems and methods providing analytical solutions for new network implementations and proposed changes to existing networks are provided herein.

SUMMARY OF THE INVENTION

In accordance with an embodiment of the present invention, a method of predicting a service criterion in a distributed computer network is provided. The method includes collecting a set of features about at least one of requests and responses that arrive at an input of the network and collecting a set of data associated with the requests or responses. The data set includes at least one of network data and system data. The method also includes determining a subset of the features which are relevant based upon the collected data set, learning dependencies between features of the subset, and specifying a scenario associated with the service criterion of the network. The scenario includes one or more conditions. The method further comprises preparing an input distribution, which includes filtering the collected data set based on the conditions specified in the scenario, and executing subsequent requirements in the scenario specification such that the data set is updated to be consistent with both the specified conditions and the dependencies among the subset of features. The method also includes outputting a predicted data set for evaluating expected operation of the scenario based on the input distribution.

In one example, specifying the scenario includes identifying changes to values of the features of the subset.

In another example, specifying the scenario includes receiving a use parameter and at least one scenario update parameter. In this example, the use parameter may specify a condition that describes a subset of the network. Here, in one alternative, the use parameter specifies the subset of the network based on a location of one or more client devices. In another alternative, the use parameter specifies the subset of the network based on a location of at least one network server. In a further alternative, the use parameter specifies the subset of the network based on properties of a service session.

In another example, the at least one scenario update parameter represents values for one or more of the subset of features.

In accordance with another embodiment of the present invention, a system for predicting a service criterion in a distributed computer network is provided. The system comprises a scenario input module, a relevant feature module, a dependencies module and an input distribution module. The scenario input module receives a what-if scenario from a user, where the what-if scenario identifies a use parameter and at least one scenario update parameter associated with the network. The relevant feature module receives a dataset of features associated with the network and for determining which ones of the features of the dataset are relevant to the what-if scenario. The dependencies module identifies which ones of the relevant features have parent or child dependencies to other ones of the relevant features. And the input distribution module filters data associated with the relevant features and executes subsequent requirements in the what-if scenario.

In one example, the input distribution module filters the data by re-sampling and re-weighing the data using a causal structure identified by the dependencies module as a guideline. Here, the re-sampling and re-weighing may be done recursively. Thus, if a first relevant feature has a child dependency to a second relevant feature then a distribution of the first relevant feature is not updated until a distribution of the second relevant feature is updated.

In another example, the filtered data forms an initial test dataset. The input distribution module updates the initial test dataset based on values specified in the subsequent requirements of the what-if scenario.

In a further example, identifying the parent and child dependencies by the dependencies module includes identifying an undirected graph and orienting edges of the undirected graph.

In yet another example, identifying the parent and child dependencies by the dependencies module includes identifying which of the relevant features are cause variables and which are no-cause variables.

In another example, identifying the parent and child dependencies employs a causal discovery algorithm. The causal discovery algorithm may execute a series of instructions using a processor. In this case, the series of instruction includes generating a fully connected undirected graph. Here, all nodes representing the relevant features are connected. The series of instructions also includes removing edges between nodes that are uncorrelated, progressively finding separating nodes between a frontier set of variables from the set of relevant features and all other variables from the set of relevant features, and adding the separating nodes to the frontier set.

In accordance with yet another embodiment of the present invention, a system for predicting a service criterion in a distributed computer network is provided. The system comprising means for receiving a what-if scenario from a user.

The what-if scenario identifies a use parameter and at least one scenario update parameter associated with the network. The system also comprises means for receiving a set of features associated with the network and for determining which ones of the features are relevant to the what-if scenario, means for identifying which ones of the relevant features have parent or child dependencies to other ones of the relevant features, and means for filtering data associated with the relevant features and for executing subsequent requirements in the what-if scenario.

In accordance with another embodiment of the present invention, a method for determining relevant variables of a distributed computer network is provided. The method comprising obtaining a dataset of variables, identifying a first variable of the dataset and determining whether the first variable is a categorical variable or a real-valued variable. Here, if the first variable is categorical, then the method comprises generating a conditional distribution for the first variable, and determining whether the conditional distribution of the first variable is statistically similar.

In one alternative, upon determining whether the conditional distribution of the first variable is statistically similar, the method further comprises discarding the first variable if the conditional distribution of the first variable is statistically similar, and storing the first variable in memory if the conditional distribution of the first variable is not statistically similar.

In another alternative, if the first variable is real-valued, the method further comprises determining whether a correlation satisfies a threshold, and if the correlation satisfies the threshold, storing the first variable in the memory.

In this case, if the correlation does not satisfy the threshold, the method may further comprise dividing a range of the variable into a series of buckets. Here, each bucket operates as a category. The method may also comprise generating the conditional distribution for the first variable and determining whether the conditional distribution of the first variable is statistically similar. In one example, upon determining whether the conditional distribution of the first variable is statistically similar, the method further comprises discarding the first variable if the conditional distribution of the first variable is statistically similar, and storing the first variable in memory if the conditional distribution of the first variable is not statistically similar.

In accordance with a further embodiment of the present invention, a method of processing data of a distributed computing network is provided. The method comprising receiving a what-if scenario indicating a change to the distributed computing network. The what-if scenario identifies a use parameter and at least one scenario update parameter associated with the network. The method also comprises obtaining a global set of data for the distributed computing network, filtering the global dataset to obtain an initial test dataset using the use parameter, applying the at least one scenario update parameter to the initial test dataset to obtain an updated test dataset, and processing the updated test dataset to output a predicted scenario result to a user. In one example, the at least one scenario update parameter comprises a plurality of scenario update parameters which are applied sequentially to the initial test dataset.

In another example, the at least one scenario update parameter comprises a plurality of scenario update parameters and at least some of the plurality of scenario update parameters are executed in parallel. Here, variables updated for each of the scenario update parameters executed in parallel do not share any common descendents other than a target variable and the updated variables are not descendents of one another.

In accordance with yet another embodiment of the present invention, a system for processing data of a distributed computing network comprises at least one processor, at least one memory for storing instructions and data for execution by the at least one processor, and a set of modules. The modules include a first module for receiving a what-if scenario indicating a change to the distributed computing network. The what-if scenario identifies a use parameter and at least one scenario update parameter associated with the network. A second module obtains a global set of data for the distributed computing network and filters the global dataset to obtain an initial test dataset using the use parameter. A third module applies the at least one scenario update parameter to the initial test dataset to obtain an updated test dataset and processes the updated test dataset to output a predicted scenario result to a user. The data stored by the at least one memory includes the global dataset, the initial test dataset and the updated test dataset and the instructions comprise module instructions of the first, second and third modules.

In one example, the at least one memory comprises a plurality of distributed memories. Here, the global dataset, the initial test dataset and the updated test dataset are stored among the plurality of distributed memories. In this case, the at least one processor may comprise a plurality of processors, with each of the processors being associated with a respective one of the plurality of distributed memories. The plurality of processors may perform a piecewise regression on the global dataset. Here, each of the plurality of processors performs a regression independently for a given tile to prune the global dataset to obtain the initial test dataset.

In accordance with a further embodiment of the present invention, a method of predicting a service criterion in a distributed computing network comprises filtering a collected data set based on at least one condition specified in a network scenario, the collected data set including information associated with network operation; executing requirements of the specified network scenario to prepare an input distribution so that the collected data set is updated to be consistent with the at least one condition and with dependencies among features associated with the collected data set; and outputting a predicted data set for evaluating expected operation of the network scenario based on the input distribution.

In accordance with yet another embodiment of the present invention, an apparatus for predicting a service criterion in a distributed computer network is provided. The apparatus comprises a number of modules including a relevant feature module, a dependencies module and an input distribution module. During operation the relevant feature module receives a dataset of features associated with the network and determines which ones of the features of the dataset are relevant to a what-if scenario. The dependencies module identifies which ones of the relevant features have parent or child dependencies to other ones of the relevant features. And the input distribution module filters data associated with the relevant features and executes subsequent requirements in the what-if scenario. A processor is operable to control execution of the relevant feature module, the dependencies module and the input distribution module.

BRIEF DESCRIPTION OF THE DRAWINGS

FIG. 4A illustrates a system in accordance with aspects of the present invention.

DETAILED DESCRIPTION

The aspects, features and advantages of the present invention will be appreciated when considered with reference to the following description of preferred embodiments and accompanying figures. The same reference numbers in different drawings may identify the same or similar elements. Furthermore, the following description does not limit the present invention; rather, the scope of the invention is defined by the appended claims and equivalents.

The present invention is very flexible and is suitable for use in many applications including computer network analysis. For instance, it may be used to evaluate proposed implementations to existing computer networks and modifications to existing networks. As will be explained in more detail below, in accordance with an aspect of the invention, a user such as a system architect may specify a networking scenario and the system predicts how a new implementation or deployment change may affect the computer network in view of the scenario.

Figure 1:
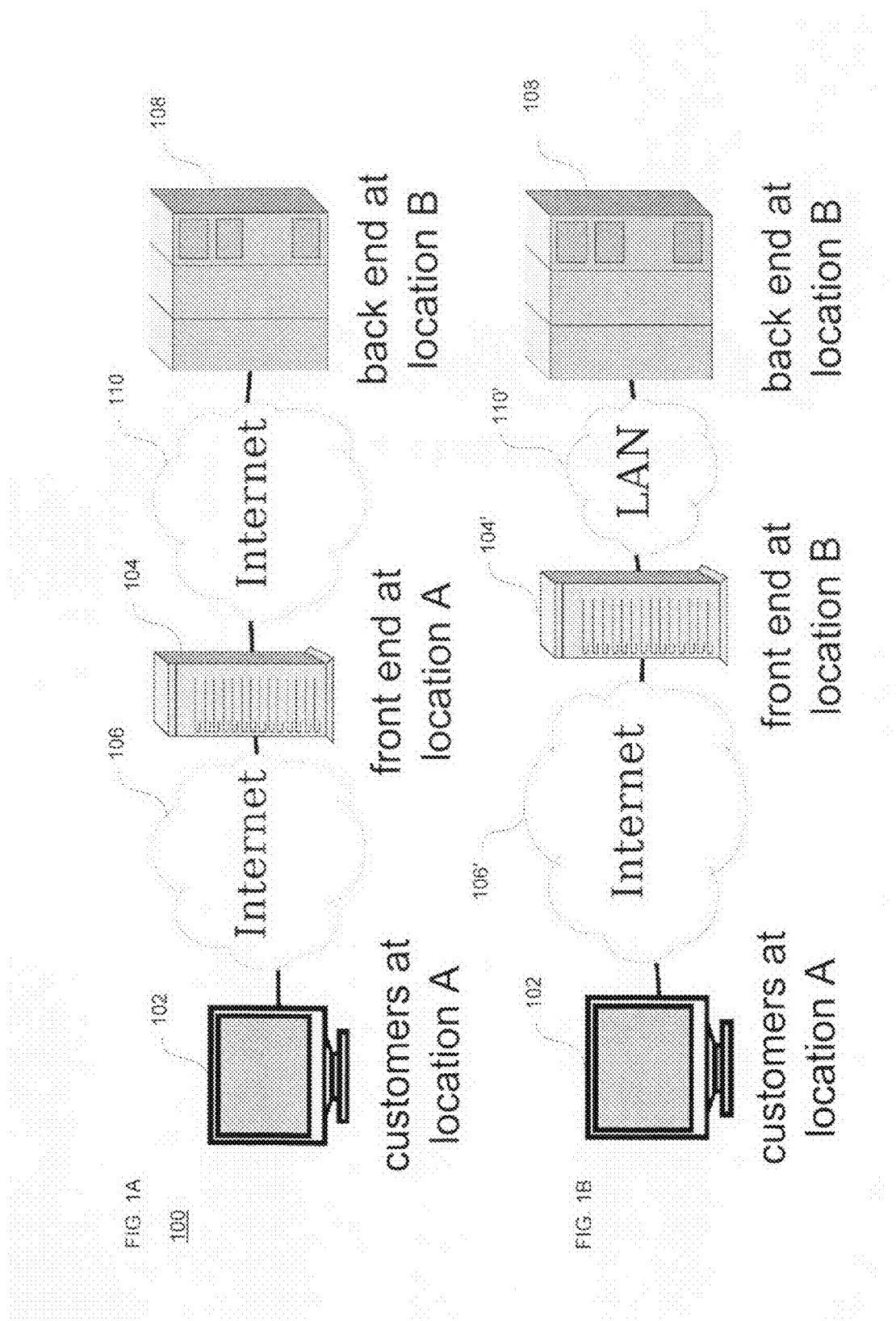
FIGS. 1A-B contrasts a pair of content distribution networks in accordance with aspects of the present invention.

An exemplary embodiment is illustrated in FIGS. 1A and 1B. As shown in FIG. 1A, a distributed computer system 100 may include one or more customers at a first location or node 102. These customers may be connected to a front end node 104 via network connection 106. In turn, the front end node 104 may be connected to a back end node 108 via connection 110. While connections 106 and 110 are shown as Internet connections, it should be understood that other types of connections may be employed. By way of example only, the network path between the nodes 104 and 108 may be over a public network or a private network. Alternatively, this network path may be part of a local area network ("LAN") such as in the case where the nodes 104 and 108 are co-located.

In the present embodiment, the front end node 104 may include one or more servers and/or other network equipment to serve the customers at node 102. In particular, the front end node 104 may operate as a data center serving traffic from customers at node 102 and elsewhere. The traffic may include, by way of example only, requests for web pages, file transfers, e-mail transmissions, instant messages, streaming audio and/or video, etc. In one example, the front end node 104 may, depending on the specific implementation, provide caching, content assembly, pipe-lining, request redirect, proxy functions, etc.

The back end node 108 may include one or more servers and/or other network equipment to serve the front end node 104. The back end node 108 may also serve other front end nodes supporting other customers. The back end node 108 may include application logic, which may be replicated and globally distributed, for instance across multiple back end nodes.

Collectively, the front end node 104 and the back end node 108 may form a content distribution network ("CDN"). In one alternative, the CDN may use domain name server ("DNS") redirection or uniform resource locator ("URL")-rewriting to direct a user to the appropriate front end and back end nodes.

Figure 2:
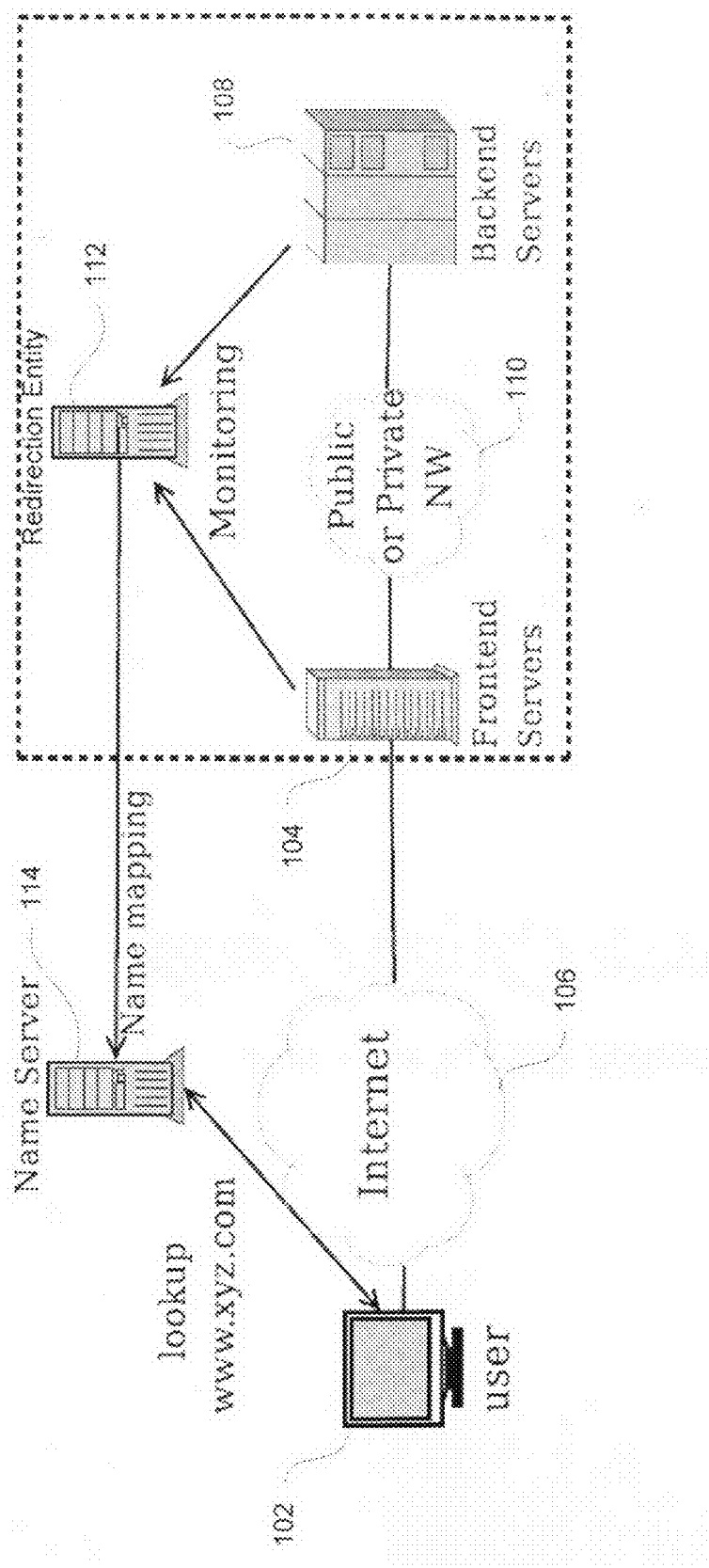
FIG. 2 illustrates an exemplary network in accordance with one embodiment of the present invention.

FIG. 2 illustrates an example of a CDN that includes the customers at node 102, the front end node 104 and the back end node 108. Here, a redirection entity 112 may monitor the nodes 104 and 108 and may be coupled to a name server 114, e.g. for name mapping. Thus, when a user served by node 102 attempts to look up a website, the node 102 may communicate either directly or indirectly with name server 114.

In accordance with aspects of the present invention, redirection/rewriting may be based on the user's proximity or general geography, on device availability, relative loading among various nodes, etc. The nodes 104 and 108 may belong to or may be controlled by a single administrative entity, or may belong to different administrative entities.

Considering the present embodiment, it may be desirable to migrate from front end node 104 to a different front end node. This may be done, for instance, to increase CDN capacity, change network connectivity, improve service response time for customers, temporarily decommission/"drain" the front end node 104 for maintenance, etc. Thus, as shown in FIG. 1B, a new configuration may include the customers at node 102, who are to be connected to a front end node 104' via connection 106'. In turn, the front end node 104' may be connected to the back end node 108 via connection 110'.

In this case, the new front end node 104' may be at a different location than original front end node 104, and thus may thus employ a different connection 106' to the customers at node 102. Similarly, the front end node 104' may utilize a different connection 110' to the back end node 108. Here, for instance, the connection 106' may be an Internet connection although, as noted above, other connections are possible. And as shown in FIG. 1B, the connection 110' may be a LAN connection for the case where front end node 104' and back end node 108 are co-located.

An important consideration may be the impact of the change from front end node 104 to new front end node 104' on the customers and the CDN in general, and on service response time in particular. For example, network designers may want to determine the effects of deploying new front end node 104' and/or a new back end node, changing either node 104 or 108 for a subset of users, changing the size of typical responses, increasing capacity or changing network connectivity. All of these will have some impact on service response time to one extent or another. In accordance with an aspect of the present invention, response time impact as a result of such reconfigurations or implementation choices should be predicted ahead of time. This will enable network architects and/or designers to make the best choices when configuring or modifying the network.

In accordance with aspects of the present invention, a network designer/architect specifies an implementation scenario for a network. A system-wide evaluation and analysis may be performed based upon the scenario and other information to predict important system parameters, including response time.

Figure 3A:
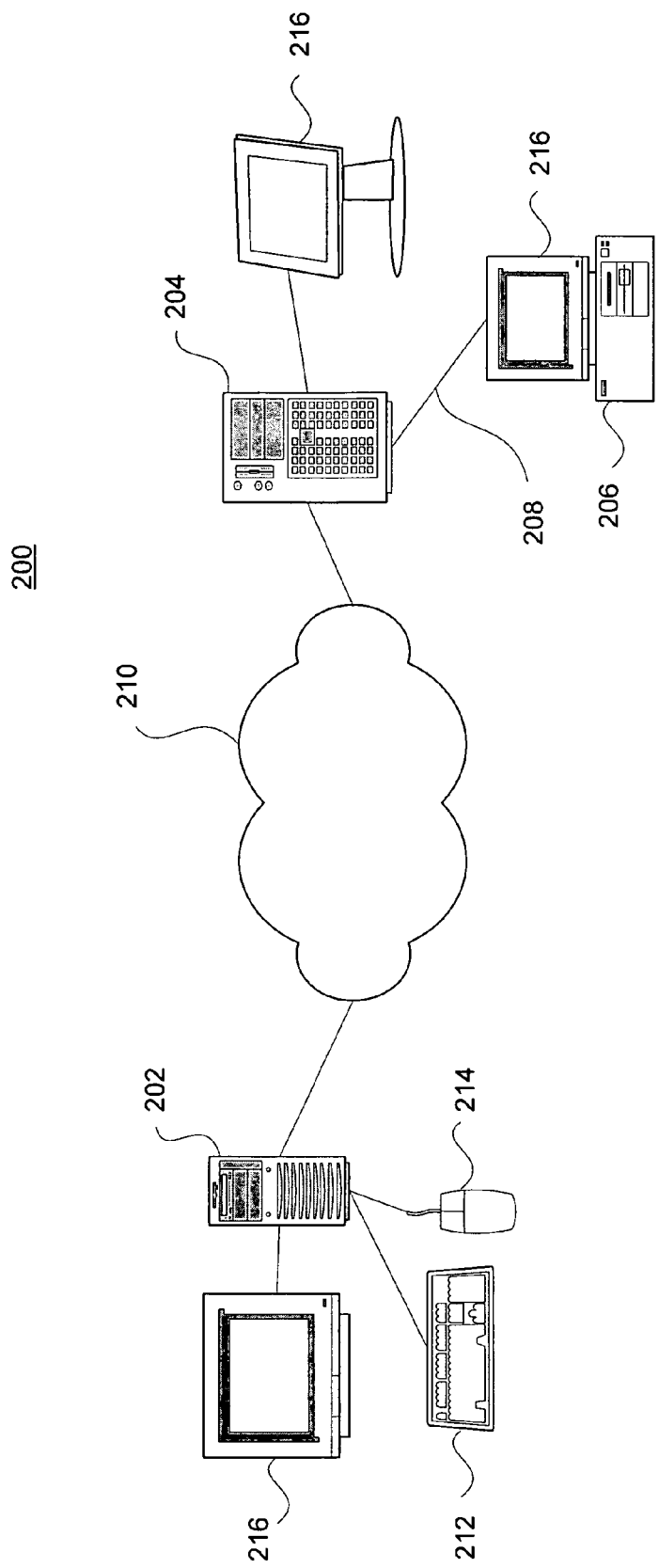
FIGS. 3A-B illustrate another exemplary network in accordance with another embodiment of the present invention.

FIG. 3A is a schematic diagram of a computer system depicting various computing devices that can be used alone or in a networked configuration in accordance with aspects of the present invention. For example, this figure illustrates a computer network 200 that has a plurality of computers 202, 204 and 206. The computer processing systems may be interconnected via a local or direct connection 208 or may be coupled via a communications network 210 such as a LAN, WAN, the Internet, etc. and which may be wired or wireless.

Each computer processing system can include, for example, one or more computing devices having user inputs such as a keyboard 212 and mouse 214 and/or various other types of input devices such as pen-inputs, joysticks, buttons, touch screens, etc., as well as a display 216, which could include, for instance, a CRT, LCD, plasma screen monitor, TV, projector, etc.

Figure 3B:
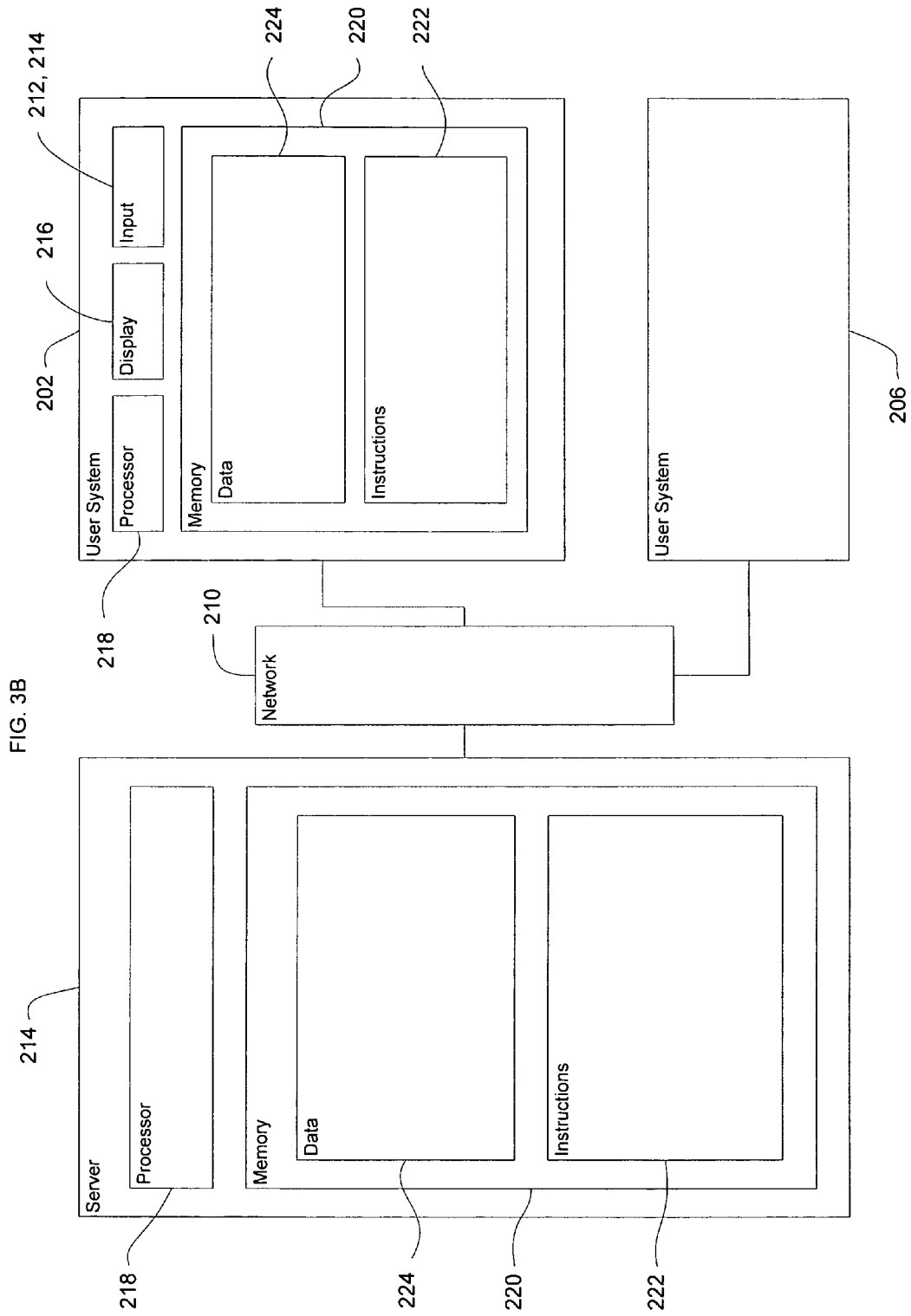

Each computer 202, 204 or 206 may be a personal computer, server, etc. By way of example only, computers 202 and 206 may be personal computers while computer 204 may be a server. For example, and as shown in FIG. 3B in particular, network 200 may include server 204 containing a processor 218, memory 220 and other components typically present in a computer.

Memory 220 stores information accessible by processor 218, including instructions 222 that may be executed by the processor 218 and data 224 that may be retrieved, manipulated or stored by the processor. The memory may be of any type capable of storing information accessible by the processor, such as a hard-drive, ROM, RAM, CD-ROM, write-capable or read-only memories.

The processor 218 may comprise any number of well known processors, such as processors from Intel Corporation. Alternatively, the processor may be a dedicated controller for executing operations, such as an ASIC.

The instructions 222 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 224 may be retrieved, stored or modified by processor 218 in accordance with the instructions 222. The data may be stored as a collection of data. For instance, although the invention is not limited by any particular data structure, the data may be stored in computer registers, in a relational database as a table having a plurality of different fields and records, XML documents, or flat files.

The data may also be formatted in any computer readable format such as, but not limited to, binary values, ASCII or EBCDIC (Extended Binary-Coded Decimal Interchange Code). Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 218 and memory 220 are functionally illustrated in FIG. 3B as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 220 such as hard drives or the like.

In one aspect, server 204 communicates with one or more client computers 202 and 206. Each client computer may be configured similarly to the server 204, with a processor, memory and instructions, as well as one or more user input devices 212, 214 and a user output device, such as display 216. Each client computer may be a general purpose computer, intended for use by a person, having all the components normally found in a personal computer such as a central processing unit ("CPU") 226, display 216, CD-ROM, hard-drive, mouse 214, keyboard 212, touch-sensitive screen, speakers, microphone, modem and/or router (telephone, cable or otherwise) and all of the components used for connecting these elements to one another.

The server 204 and client computers 202, 206 are capable of direct and indirect communication with other computers, such as over network 210. Although only a few computers are depicted in FIGS. 3A and 3B, it should be appreciated that a typical system can include a large number of connected servers and clients, with each different computer being at a different node of the network. The network 210, and intervening nodes, may comprise various configurations and protocols including the Internet, intranets, virtual private networks, wide area networks, local networks, private networks using communication protocols proprietary to one or more companies, Ethernet, WiFi and HTTP.

Communication across the network, including any intervening nodes, may be facilitated by any device capable of transmitting data to and from other computers, such as modems (e.g., dial-up or cable), network interfaces and wireless interfaces. Server 204 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers in accordance with the systems and methods described herein may comprise any device capable of processing instructions and transmitting data to and from humans and other computers, including network computers lacking local storage capability, PDA's with modems and Internet-capable wireless phones.

FIG. 4A presents an exemplary system 300 illustrating functional modules in accordance with an embodiment of the invention. As shown, the functional modules may include a scenario input module 302, a relevant feature module 304, an input distribution preparation module 306, a dependencies module, and an output module 310. The modules may be implemented in software and/or hardware and may be distributed among one or more of the computers 202, 204 and 206 of FIG. 3A.

Scenario Specification

As shown in FIG. 4A, the scenario input module 302 and the relevant feature module 304 may receive input from external sources, and the output module 310 may output processed results. In one example, the modules 302, 306 and 310 may operate as part of a run-time environment, while the modules 304 and 308 may operate in an off-line mode, although such operation is not required.

The scenario input module 302 may receive its input from a system architect/designer. By way of example only, a system architect may specify a "what-if" scenario in order to test the impact of a new network implantation or change to an existing network. As in the example above, one what-if scenario may involve swapping out one front end node for another while other what-if scenarios may involve implementing other changes which could impact system performance or operation.

In accordance with aspects of the present invention, a system's performance may be predicted (e.g., in terms of response-time distribution) under a set of parameters that the network designer specifies. Statistical learning techniques may be used to accomplish this goal. As has been discovered, there are a number of areas which help make what-if scenario prediction well-suited for statistical learning: (1) an underlying model that is difficult to derive from first principles but provides a wealth of data; (2) a need to predict outcomes based on data that may not directly represent the what-if scenario in question; and (3) the need to constrain network designers and similar users so that they specify valid inputs for what-if scenarios.

It should be understood that CDNs and other networks are complex systems. However, observable features/variables of such systems are driven by fundamental properties of each system. The terms feature and variable are used interchangeably herein. When a system has well-understood relationships that can be represented in evaluatable formulas, what-if scenario processing evaluates such formulas for the values prescribed in the scenario.

Unfortunately, in distributed systems such as CDNs, parameters that govern system performance and the relationships between them, as well as the functions that govern the response-time distribution of the system, are often complex and characterized by randomness and variability that are difficult to represent or model as simple formulas.

In accordance with aspects of the present invention, underlying fundamental properties and dependencies that determine a CDN's response-time or other operation may be observed as correlations and joint probability distributions of the variables that define the system, including the service response-time. By observing these joint distributions (e.g., response-times observed under various conditions), statistical learning or other algorithms may infer information about the underlying function(s) that affects the response-time. Beneficially, many real world CDNs collect comprehensive datasets for their services as part of everyday operational and monitoring needs. Thus, the requisite datasets that can be used to learn about response-time function and other variables may be readily available.

Obtaining datasets that directly represent a given what-if scenario may be challenging. Evaluating a what-if scenario involves providing input data that is representative of that scenario. Unfortunately, data collected from an existing network deployment represents only the current setup, and the system complexities make it difficult for a designer to manually "transform" the data to represent the new scenario.

Fortunately, depending on the extent of the dataset that is collected and nature of the what-if scenario, one may learn the dependencies among the variables and use the dependency structure to intelligently re-weigh and re-sample different parts of the existing dataset to perform a given transformation. In particular, if a given what-if scenario is expressed in terms of the changes to values of the variables that are observed in the dataset and the changed values or similar values of these variables are observed in the dataset even with small densities in the original dataset, the original dataset may be transformed to one that is representative of the what-if scenario without necessitating substantial input from the network designer.

In one example, the system 300 may prepare a distribution of variables that is representative of particular what-if scenario. The system may then obtain a response-time distribution through regression function estimation and other statistical techniques as will be explained in more detail below.

The scenario input/specification module 302 may include a user interface for interaction with the network designer or other such user. For instance, the module 302 may presents a network designers with an easy-to-use interface which may be in the form of a scenario specification language or a graphical user interface, which may be implemented as part of a website or other interactive graphical application. The language based interface may permit a designer to specify a baseline setup as well as any hypothetical values for a what-if scenario in a few short lines of code.

The scenario specification language may allow the designer(s) to evaluate a given scenario for an arbitrary subset of customers. The language may also provide a set of built-in operators to facilitate scenario specification as relative changes to the existing values of variables or new values from scratch. Thus, in this example, system designers are shielded from the complexity of dependencies among variables, because the scenario input module 302 may automatically update dependent variables.

Determining Relevant Variables

Before examining the scenario specification language and what-if scenario generation in more detail, it should be understood that the system 300 may manage a large number of system variables. And as a user may input or program information concerning a given what-if scenario into the scenario input module 302, system variables may also be provided to the relevant feature module 304. The system variables may be part of a comprehensive dataset that covers many combinations of variables. In one example, existing network monitoring infrastructure may typically provide such a dataset. An exemplary feature dataset is provided in Table I below.

TABLE I exemplary dataset features

| Feature | Description |
|---------|-------------|
| ts | Time stamp instance of arrival of request at the front end node |
| tod | Time of day |
| sB | Number of bytes sent to user from a server node, not including any data which may be retransmitted to TCP/IP header bytes |
| sP | Number of packets sent by server node to client, excluding retransmissions |
| cP | Number of packets sent by client that are received by server node, excluding retransmissions |

TABLE I-continued exemplary dataset features

| Feature | Description |
|---|---|
| srP | Number of packets retransmitted by server node to client, either due to loss, reordering or timeout at server node |
| crP | Number of packets retransmitted by client that are received at server node |
| region | The IP address of client is mapped to a region identifier at country and state granularity. The/24 network address and originating AS number are also determined. These attributes are collectively referred to as "region" |
| fe | Alphanumeric identifier for front end node/data center at which a request was received |
| be | Alphanumeric identifier for back end node/data center serving a request |
| rtt | Round-trip time between user and front end node estimated from initial TCP three-way handshake |
| febe_rtt | Network level round-trip time between front end node and back end node |
| be_time | Time between instance that the back end node receives a request forwarded by a front end node and when the back end node sends a response to the front end node |
| rt | Total response time fro a request as seen by the front end node |

The scenario specification language may employ a simple, SQL-like syntax. This enables the user to provide an accurate scenario to the scenario input/specification module 302. In one example, a scenario specification may include a "use" statement followed by one or more optional scenario "update" statements. An illustrative example is provided below.

```
scenario = use_statement {update statement};
use_statement = "USE" ("*" | condition_statement) <EOL>;
update statement = ("ASSUME" | "INTERVENE"*) (set_statement |
    setdist_statement) [condition_statement] <EOL>;
set_statement = "SET" ["RADIAL"* | "FIXED"] feature set_op
    value
setdist_statement = "SETDIST" feature
    (dist_name"(" [param] ")" | "FILE" filename)
condition_statement = "WHERE" condition;
condition = simple_condition | compound_condition;
simple_condition = comparison_statement |
    "(" simple_condition ")";
compound_condition = "(" simple_condition ("AND" | "OR")
    (simple_condition | compound_condition) ")";
comparison_statement = (feature rel_op value) |
    set_membership_test;
set_membership_test = feature "IN" "(" value {,value} ")";
set_op = "+=" | "-=" | "*=" | "\=" | "=";
rel_op = "<=" | ">=" | "<>" | "==" | "<" | ">";
feature = "country" | "continent" | "as_num" | "s24" | "s16" | "s8" |
    "rtt" | "rt" | "sB" | "ts" | "fe" | "be";
```

In this example, the "use" statement specifies a condition that describes a subset of the network which the designer is interested in evaluating. Depending on the features available in the global dataset, the designer may specify a subset of the network based on location of clients (such as country, network address, or AS number), the location of servers, properties of service sessions and/or a combination of these. As a result, this statement provides a powerful tool for the designer in choosing the starting scenario.

The "update" statements allow the designer to specify what-if values for various variables and features for the service session properties. Each scenario statement may begin with either an INTERVENE or ASSUME keyword and allows conditional modification of one variable. If the update statement begins with the INTERVENE keyword, the algorithm may first update the value of the variable in question.

The system may also intelligently use a causal dependency structure to ensure that the dataset remains consistent with the underlying dependencies. For this the system may use a process called Statistical Intervention Effect Evaluation, which is discussed in detail below.

Advanced designers can override the intelligent update behavior by using the ASSUME keyword in the update statement. In this case the system may update the distribution of the variable specified in the statement but does not attempt to ensure that the distribution of the dependent variables are correspondingly updated. This facility is applicable to situations where the designers have reasons to believe that the scenario that they wish to evaluate involves changes to the underlying invariant laws that govern the system.

Figure 5:
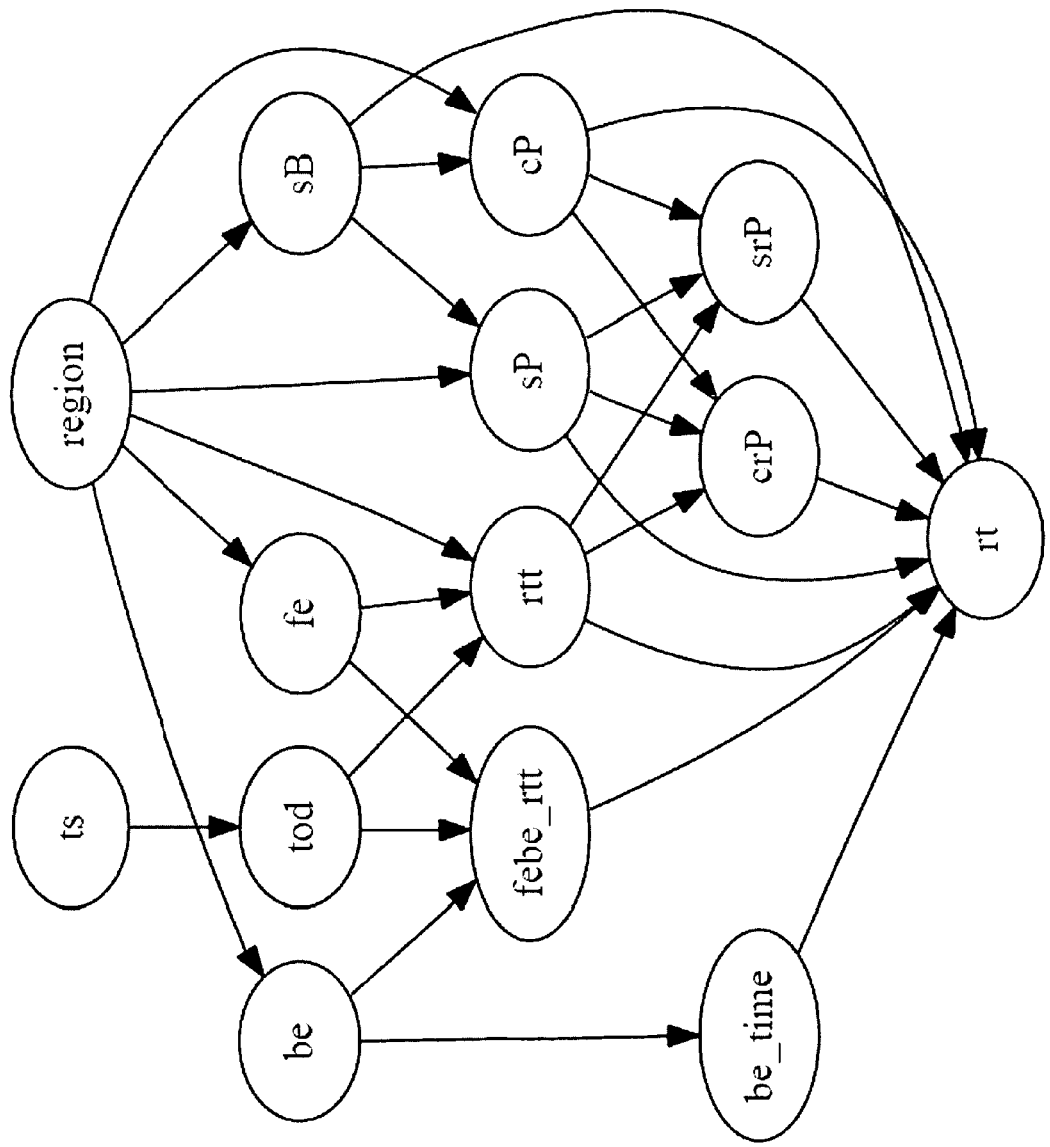
FIG. 5 illustrates a directed acyclic graph in accordance with aspects of the present invention.

Many datasets are causal in nature, where the effect of one feature impacts other features. The dependencies module 308 may be used to calculate causality among various features as part of the overall analysis. By way of example only, FIG. 5 illustrates an example of causality among features in Table I which may be produced by the dependencies module 308. FIG. 5 is presented as a directed acyclic graph ("DAG"), where the nodes are variables/features and the arrows indicate dependencies among the variables/features.

In the scenario specification language example above, if a variable has no descendents in the causal structure other than the target variable, then the two types of update statements behave identically.

As shown in FIG. 5, the region and ts variables may be considered "no-cause" variables as they have no prior dependencies. Many of the causal relationships in shown in this figure are straightforward and may make intuitive sense in the context of networking. However, some of the relationships may be quite surprising. For instance, the dependencies module 308 may detect a relationship between the region and sB attributes. It has been determined that this relationship may exist due to slight differences in the sizes of search response pages in different languages and regions.

Another unexpected relationship in this example is between the region, cP and sP attributes. Here, the dependencies module 308 may identify that this relationship exists due to different maximum transmission unit ("MTU") sizes in different parts of the world.

It should be noted that many variables from Table I are not direct children of the region, ts, fe or be variables. This implies that when conditioned on the respective parents, these variables are independent of region, time, choice of front end node and back end node. Thus, according to an aspect of the invention, it is possible to use training data from the past, different regions, and/or different front end and back end data centers to estimate the distributions for these features.

It should be appreciated that while many variables in the dataset may be correlated, the in-degree for each variable is smaller than the total number of variables in the graph. As used herein the term "in-degre" refers to the number of nodes (e.g., variables) that are direct parents of another node of the directed acyclic graph. This may be used to reduce the number of dimensions that a system in accordance with aspects of the present invention must consider for estimating the values of the variables in the input preparation and response-time estimation phases of scenario evaluation. This, in turn, would allow the system to produce more accurate estimates, more quickly and with less data.

As noted above, there may be instances when there is little to no data about a given feature/variable. For instance, if the dataset does not include load, utilization or data center capacity variables, it may be difficult to model the be_time variable. In this situation, observation may indicate that the be_time distribution may vary to some extent among different data centers. As a result, the be_time variable may appear as a "black-box" variable in the graph of FIG. 5. Nonetheless, the system 300 is able not only to discover relationships that are faithful to how networks operate but also discover relationships that might escape even trained network engineers.

In some instances, the system variable dataset such as the example shown in Table I may contain variables that are not relevant to a given what-if scenario. In accordance with an aspect of the present invention, the relevant feature module 304 extracts a set of relevant variables from the dataset, pruning out the rest of the variables. This may be done before the dependencies module 308 operates on received data to identify dependencies. The pruned dataset generated by relevant feature module 304 is referred to herein as a global dataset or a training dataset. In an alternative, the relevant feature module 304 and/or the dependencies module 308 may also identify missing or latent variables that may hamper what-if scenario evaluation.

The pruned dataset may have many interacting variables. When evaluating a what-if scenario, values for input variables should "make sense." For instance, an accurate prediction of the response-time distribution for a given scenario can be accomplished using a joint-distribution of the input variables that is representative of a what-if scenario and is also consistent with the dependencies that are inherent to the system itself.

By way of example, the distribution of the number of packets that are transmitted in the duration of a service session depends on the distribution of the size of content that the server returns in reply to a request. If the distribution of content size changes, then the distribution for the number of packets that are transmitted also changes in a particular fashion. Further, the change might cascade to other variables that in turn depend on the number of packets that are sent as part of a request.

To enforce consistency of input variables, the system 300 may learn the dependency structure among the relevant variables. In one embodiment, the system 300 represents such relationships as a Causal Bayesian Network ("CBN"). This dependency structure not only helps enforce consistency of input variables, but also makes evaluating what-if scenarios more efficient.

When conditioned on its parent variables, a given variable $x_i$ in a CBN is independent of all other variables in the DAG except its decedents. An optimal DAG is for a dataset one where find the minimal parents of each node that satisfy above property.

Figure 6:
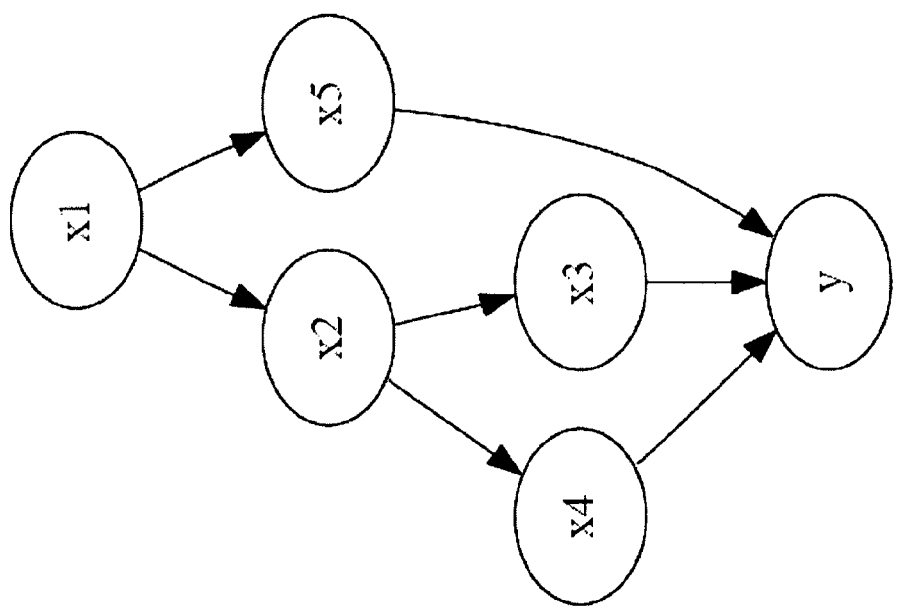
FIG. 6 illustrates another directed acyclic graph in accordance with aspects of the present invention.

As an example of how a causal structure may facilitate scenario specification and evaluation, consider a dataset with five input variables x1, x2, x3, x4 and x5, as well as a target variable y. Such an example is shown in the directed acyclic graph of FIG. 6. A node is said to have a causal relationship with its decedents if a change in the value of the variable causes a change in the values of its decedents.

In an example, if the system 300 is presented with a what-if scenario that requires changes in the value of variable x2, the distribution of variables x1 and x5 will remain unchanged in the input distribution. In contrast, the distribution of descendents of x2 will need to be updated to maintain consistency. In accordance with an aspect of the present invention, the system 300 constrains the input distribution by intelligently re-sampling and re-weighing the dataset using the causal structure as a guideline.

Turning to a real world application, in another example a what-if scenario may involve assessing the impact of a network change on overall response time. In this case, the system (e.g., relevant feature module 304) may automatically identifying the variables that are relevant to response-time. This may be done via pairwise independence tests of all feature variables in the dataset with the response-time variable. Here, any variables deemed independent of the response-time variable may be discarded.

For each categorical variable (variables that do not have numeric meanings) in the dataset, such as country of origin of a request or AS number, the relevant feature module 304 may obtain conditional distributions of response-time for each categorical value. The relevant feature module 304 may discard a variable if all the conditional distributions of response-time are statistically similar. This may be evaluated with the Kolmogorov-Smirnov (KS) test, which is a standard test for testing similarity between a pair of empirical distributions, with a significance level of 10%. See, for instance, "All of Statistics: A Concise Course in Statistical Inference," by Larry Wasserman, copyright 2004, Springer Science and Business Media, Inc., the entire disclosure of which is hereby expressly incorporated by reference herein.

For real-valued variables, the relevant feature module may first test for correlation with the response-time variable. Here, a variable may be retained if the correlation coefficient is greater than a certain percentage such as 10%. In an alternative, the variable may be retained if the percentage of the correlation coefficient is at least 7.5%. In accordance with an aspect of the present invention, there is no specific lower limit for the correlation coefficient; rather, the specifics of the "what if" scenario and/or the network under analysis may determine the percentage for the correlation coefficient. In one example, there may be a tunable threshold for the correlation coefficient. For instance, the threshold may initially be set to a value such as 10%, but may be tuned across a wide range, e.g., between 5.0% and 20% or a narrower range, e.g., between 7.5% and 12.5%.

Unfortunately, for continuous variables, a lack of correlation does not necessarily imply independence. Thus, the relevant feature module 304 may not outright discard the variable if a small correlation is observed. An example of such a variable in a dataset is a time-stamp for a web transaction. Here, if the response-time has diurnal variability then timestamp is clearly not independent of the response-time.

However, correlation may cancel out over a diurnal cycle, yielding small values for correlation coefficient. For such cases, the relevant feature module 304 may divide the range of the variable in question into small buckets and treat each bucket as a category. The same techniques applied to the categorical variables may then be applied to determine whether the variable is independent. Another technique which may be applied is known as feature selection with Akaike Information Criteria, as explained in the "All of Statistics" text by Wasserman.

While there may be a possibility of discarding a variable that is not independent of the response-time, it is unlikely if sufficiently small buckets are used. Thus, in accordance with an aspect of the present invention, bucket size depends on the variable in question. In one example, one-hour buckets may be used for a time-stamp variable.

Figure 7:
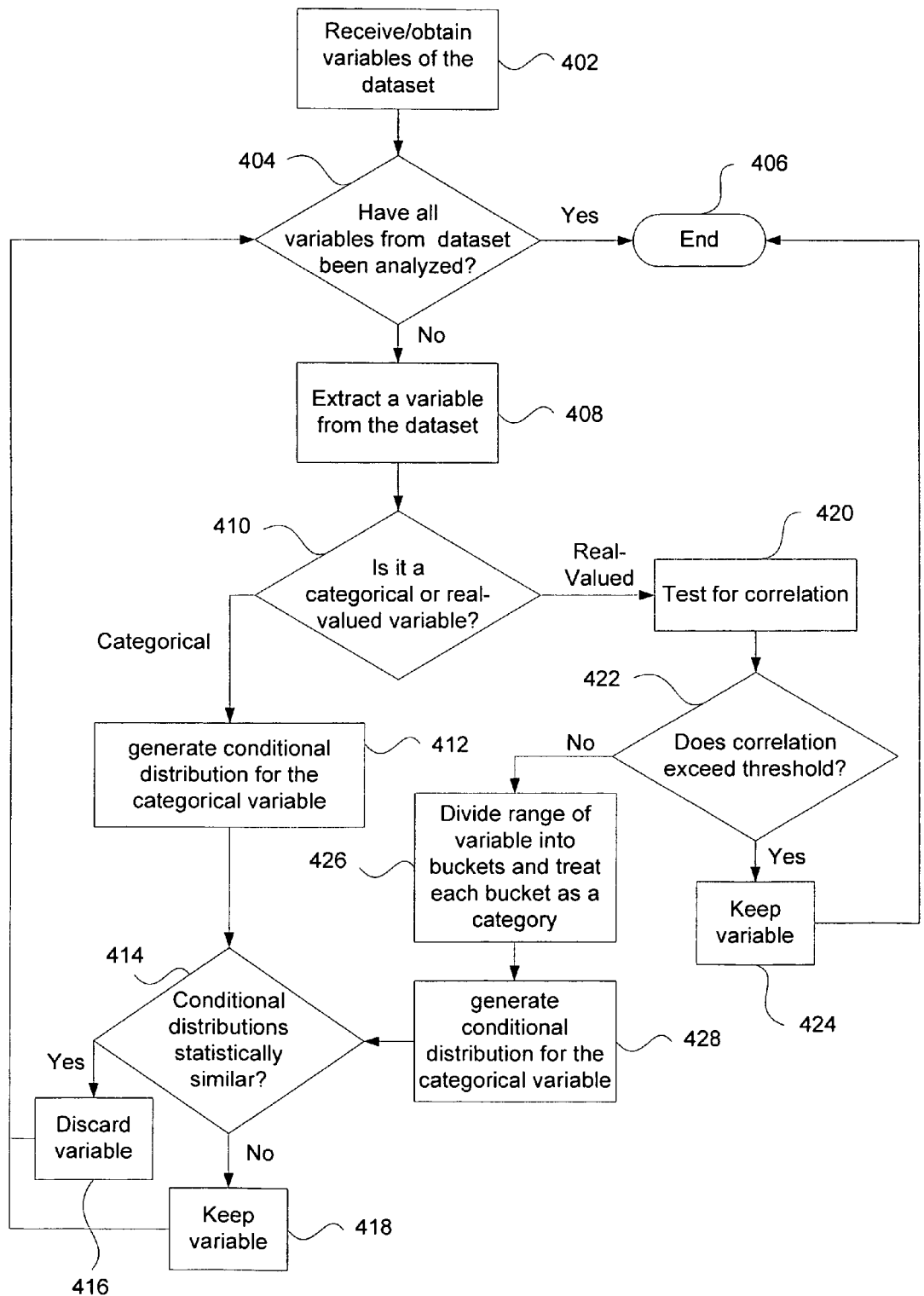
FIG. 7 presents a flow diagram in accordance with an embodiment of the present invention.

In view of the above, FIG. 7 presents an algorithm 400 for finding relevant variables in accordance with aspects of the present invention. In block 402 the variables of the dataset are received, e.g., from a database, spreadsheet or archive, or are otherwise obtained. Then in block 404 a determination is made as to whether all variables in the dataset have been analyzed. If they have, then the process terminates at block 406.

Otherwise, at block 408 a variable is extracted or read from the dataset. Then at block 410 it is determined whether the variable is a categorical variable or a real-valued variable. If the variable is categorical, then at block 412 a conditional distribution is calculated for the variable. Next, a determination is made as to whether the conditional distributions of the variable are statistically similar, as shown in block 414. This may be done, by way of example only, by the KS test as discussed above.

If the conditional distributions are statistically similar, then the variable is discarded at block 416 and is not one of the relevant variables/features that may be used by system 300. However, if the conditional distributions are not statistically similar, then the variable is retained as shown by block 418. Regardless of whether a given variable is kept or discarded, the process may return to block 404.

In the case where the variable is real-valued, a correlation test is performed as shown by block 420. An evaluation is conducted at block 422 to see if the correlation (e.g. a correlation coefficient) exceeds a threshold such as 10%. If correlation exceeds the threshold, then the variable is retained as shown at block 424. However, if correlation does not exceed the threshold, then at block 426 a range of the variable is divided into buckets. Here, each bucket is treated as a category. As shown at block 428 a conditional distribution is calculated for the variable. Next, the process continues at block 414, where a determination is made as to whether the conditional distributions of the variable are statistically similar. This may be done, by way of example only, by the KS test as discussed above.

As in the situation where the variable is categorical, if the conditional distributions are statistically similar, then the variable is discarded at block 416 and is not one of the relevant variables/features that may be used by system 300. However, if the conditional distributions are not statistically similar, then the variable is retained as shown at block 418. Regardless of whether a given real-value variable is kept or discarded, the process may return to block 404.

It should be understood that while the relevant feature module 304 and/or the dependencies module 308 may identify relevant and potentially missing variables in conjunction with the algorithm 400, the nature of what-if scenarios is such that an evaluation and analysis may be limited by the variables in the input dataset. Thus, if a variable which may impact system performance is not included in the input dataset and is not otherwise captured or recorded, then the results from the output module 310 may not accurately predict network operation. Therefore, if a monitoring infrastructure is employed with a network, a careful choice of variables that the monitoring infrastructure collects from a CDN may enhance the utility of dataset for evaluating a what-if scenario. By way of example only, a person familiar with system operation, such as a network architect or engineer, may select the variables.

Learning Dependencies

Learning the causal structure among the variables is very important to automatically prepare input datasets that are consistent with both the what-if scenario specification and any underlying dependencies in the dataset. In one embodiment, in order to learn the causal structure the system first learns or identifies an undirected graph and then uses a set of rules to orient the edges. As used herein, the term "undirected graph" refers to a graph where the edges are not given a direction, e.g., as illustrated by simple lines in contrast to lines with arrows showing direction.

As discussed above, in a Causal Bayesian Network a variable, when conditioned on its parents, is independent of all other variables except its descendents. Furthermore, an optimal CBN requires finding the smallest possible set of parents for each node that satisfy this condition. Thus, by definition, a pair of variables a and b in the CBN have an edge or connectivity between them only if there is no subset of separating variables, $S_{ab}$, such that a is independent of b given $S_{ab}$. This, in the general case, requires searching all possible $O(2^n)$ combinations of the n variables in the dataset.

In accordance with another aspect of the present invention, a causal discovery algorithm uses a heuristic to guide the search of separating variables when the system has prior knowledge of a subset of variables that are not caused by any other variables in the dataset. Such variables are referred to as "no-cause" variables. The causal discovery algorithm need not perform an exhaustive search for separating variables; however in this instance the resulting graph may not be optimal.

The causal discovery algorithm may start with a fully connected undirected graph and removes the edges among variables that are clearly not dependent (e.g., showing no correlation). An example is shown below.

```
1:   Causal Discovery Algorithm (W₀,V)
         /*Notation
         W₀ : set of no-cause variables
         Δ : maximum allowable cardinality for separators
         a⊥b : Variable a is independent of variable b */
2:   Make a complete Graph on V
3:   Remove all edges (a,b) if a⊥b
4:   U = All Remaining Edges in Graph
5:   W = W₀
         /*Explore in order of increasing cardinality*/
6:   for c = 1 to Δ
7:       LocalPrune (W, c)
```

The causal discovery algorithm may then progressively find separating nodes between a restricted set of variables (called "frontier" variables) and the rest of the variables in the dataset. This may be done in the order of increasing cardinality of allowable separating variables. Initially the frontier variables may comprise only no-cause variables. An example is shown below.

```
1:   LocalPrune (W, c)
         /*W: frontier variables*/
         /*Try to separate neighbors of frontier variables*/
2:   ∀ w ∈ W
3:       ∀ y ∈ N(w) /*neighbors of w*/
4:           if ∃x ⊆ N(y) \w : |x| ≤ c, y ⊥ w|x
5:           then /*found separator node(s)*/
                 /*assign the separating nodes*/
                 Swy = x
                 /*remove y from neighbors of w*/
6:           Remove the edge (w,y)
                 /*Update the new frontier variables*/
7:           W = W ∪ x
```

As the causal discovery algorithm discovers separating variables, it adds them to the set of frontier variables. The causal discovery algorithm may terminate as soon as separation sets up to a certain maximum cardinality $\Delta \leq n$ are explored. Because the causal discovery algorithm may not explore separating nodes sets beyond a certain maximum cardinality, it is possible that certain variables that are separable are not separated. However, this does not result in false dependencies, only that potentially transitive dependencies are now considered direct dependencies. This limitation does not affect the system's ability to accurately create datasets that are representative of the what-if scenario as well as the underlying dependencies.

In cases where the set of no-cause variables is unknown, the causal discovery algorithm may rely on the "PC-algorithm," which is detailed in the article "An algorithm for fast recovery of sparse causal graphs," by P. Sprites and C. Glymour, found in Social Science Computer Review 9, USENIX Symposium on Internet Technologies and Systems, 1997, the entire disclosure of which is hereby expressly incorporated by reference herein. The causal discovery algorithm may again perform searches for separating nodes in the order of increasing cardinality among all pair of variables. In an example, this may be done in no particular order.

The causal discovery algorithm may orient the edges and attempt to detect latent variables using following process. First, if a node c has nonadjacent neighbors a and b, and c ∈ $S_{ab}$, then orient edges a→c←b (unmarked edges). Next, for all nonadjacent nodes, a, b with a common neighbor c, if there is an edge from a to c, but not from b to c, then add a marked edge c→b. Then, if a and b are adjacent and there is directed path of only marked edges from a to b, then add a→b. See, for instance, "Causality: Models, Reasoning, and Inference," copyright 2000 by Judea Pearl, the entire disclosure of which is hereby expressly incorporated by reference herein.

In the finished graph, any unmarked, Bi-directed, or undirected edges signify possible latent variables and ambiguity in causal structure. In particular, a→b means either a really causes b or there is a common latent cause L causing both a and b. Similarly, a ↔b, signifies a definite common latent cause, and an undirected edge between a and b implies either a causes b, b causes a, or a common latent cause in the underlying model.

Preparing Input Distribution

After a what-if scenario is entered and relevant features have been identified, the input distribution preparation module 306 of FIG. 4A may prepare a representative distribution for the scenario. A discussion is now provided for how a system in accordance with the present invention may use the dataset, causal structure, and scenario specification that a designer specifies to prepare a distribution of the dataset that is representative of both the what-if scenario and is also consistent with the system dependencies.

An initial action may be to extract a subset of the dataset on which the scenario will be evaluated. Here, a system such as system 300, may filter the global dataset for the entries that match the condition specified in the use-statement of the scenario specification. The dataset obtained after the filtering may be referred to as the initial "test dataset." A next action may be to update the initial test dataset based on the what-if values specified in the scenario specification.

Here, the system may execute the update statements, one statement at a time. In an alternative, one or more update statements may be executed in parallel. Here, for instance, two lines should satisfy the following condition to be executed in parallel. Specifically, the variables updated in each of the two lines must not share any common descendents other than the target variable, and neither variable must be a descendent of the other. Such serial operation or alternative parallel operation allows the system to ensure consistency among variables after every INTERVENE update statement. For this, a process called Statistical Intervention Effect Evaluation may be employed.

As an example, one may denote the action requested on a variable xi in the update-statement as set($x_i$). $x_i$ may be referred to as the "intervened" variable. One may also denote a set of variables that are children of $x_i$ in the CBN for the dataset as $C(x_i)$. The statistical intervention effect evaluation process provides that the distribution of children of $x_i$ is given as: $Pr\{C(x_i)|set(x_i)\}$. The expectation is that if a variable has a causal effect on another, such as in a CBN where the parent node has a causal effect on its descendent nodes, then a change in the value of the parent must cause a change in the value of the children. Furthermore, the new distribution of children would be one that is expect to be observe under the changed or newly set values of the parent.

To apply such a process, an exemplary system may condition the global dataset on the new value of the intervened variable, set($x_i$), and the existing values of the all the parents of children of the intervened variable, $P(C(x_i))$, in the test dataset, excluding the target variable. The system would thus obtains a subset of the global dataset in which the distribution of $C(x_i)$ is consistent with the action set($x_i$) as well as the scenario in question.

As the causal effect cascades to all the decedents of $x_i$, the system (e.g., module 306, may repeat the process recursively, now considering $C(x_i)$ as the intervened variables and updating the distributions of $C(C(x_i))$, and so on, until all the descendants of $x_i$ (except the target variable) have been updated. A caveat may exist in such a process. The distribution of a descendant of $x_i$ should not be updated until the distribution of all of its ancestors that are descendant of $x_i$ have been updated.

The system, such as in module 306, may order the sequence of updates by traversing the CBN directed acyclic graph breadth-first, beginning at node $x_i$. Module 306 may then repeat this process for each statement in the scenario specification, one after the other. The updated test dataset produced after each statement serves as the input dataset for the next statement.

Once all statements are executed, the test dataset is the representative joint distribution variables for the scenario specified by the designer or other user. The above algorithm may be applied when the causal structure is unambiguous. In cases where an edge between two variables is undirected, the module 306 may maintain the consistency of the dataset by always updating the distribution of one variable if the distribution of the other variable is updated. In the case of common latent structures, the module 306 may apply an imaginary latent variable with directed edges to a and b and use the resulting structure to traverse the graph while preparing the input distribution.

Preparing Resultant Output

Once an input distribution has been prepared, the system 300 may generate an output, e.g. via output module 310, for use by the system designer or other user. Examples of such output include charts, plots, graphs and any other representation to identify information of interest. For instance, the output could present improvements (or delays) in network operation on a user's display using images, colors, fonts, sounds, etc.

Figure 4B:
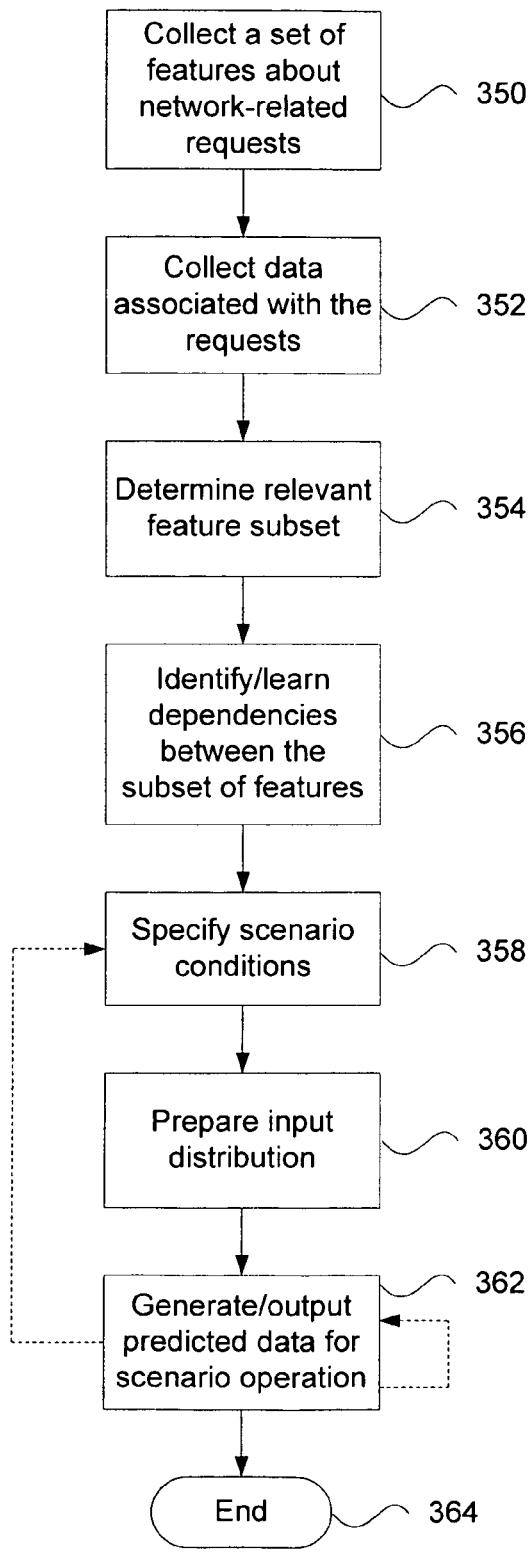
FIG. 4B illustrates a method of operation of the system of FIG. 4A in accordance with aspects of the present invention.

An exemplary operation of the system 300 is shown in FIG. 4B. Here, a set of features/variables associated with network-related requests may be collected as shown by block 350. And in block 352 data associated with the requests may also be collected. The collected information may be stored in a memory, such as memory 220 of FIG. 3B. Such information may be indexed, by way of example only, as part of a database or the like.

As shown in block 354, a relevant subset of features may be determined, such as by module 304 of FIG. 4A. Dependencies between the subset of features may be identified or otherwise learned as shown in block 356. This may be done, by way of example only, by dependencies module 308.

One or more what-if scenario conditions may be specified as shown by block 358. This may be done using scenario input module 302, for instance with the scenario specification language tool discussed above. Of course, it should be understood that the what-if scenario may be input at any time and it is not required to be done after dependencies have been identified.

An input distribution may be prepared as shown by block 360. This may be done using, e.g., the input distribution preparation module 306 based upon information received from modules 302, 304 and/or 306. Upon preparation, predicted data and any other associated data may be generated and/or output, such as for display to a user. This is shown by block 362. Once completed, a given process may terminate as shown by block 364. Alternatively, a process may return to any of the other blocks 350-360 or remain at block 362 for further operation.

By way of example only, the dashed lines in FIG. 4B show that a process may return to block 358 or remain at block 362. In the first alternative, the user may thus specify a new scenario to test. In the second alternative, the user may request a different output, or may want to see a different mode of representing the predicted network operation.

In another situation, the system designer may be interested in the effect of a change on system response time. As a parametric response-time function may not be known for a service in a content distribution network, a system such as system 300 may use a non-parametric regression method to estimate the response-time. By way of example only, the system may use a Kernel Regression (KR) method and use a radial-basis function as the Kernel. The KR method is described in "Data Analysis Using the Method of Least Squares: Extracting the Most Information from Experiments," by John Wolberg, published by Springer and copyright 2006, the entire disclosure of which is hereby expressly incorporated by reference herein.

The KR method estimates the response-time for a request in the test data by essentially computing a weighted average of the response-times of requests seen in the training (global) dataset, such that the weight of response-time for a request in the training dataset decreases roughly quadratically as the similarity of features of the training dataset request with the test dataset request decreases. As there may be hundreds of millions of requests in a training dataset, an exemplary system in accordance with aspects of the present invention may restrict the function to only a subset of near-by requests. This yields both computational and accuracy benefits.

As the number of dimensions (e.g., variables in the dataset) grows, exponentially more data may be needed for consistent accuracy of estimation. This problem is relevant to content distribution network systems because the response-time may depend on a large number of variables and is thus a high dimensional problem. In accordance with aspects of the present invention, a system such as system 300 may use a Causal Bayesian Network to mitigate this problem.

In particular, when conditioned on its parents, a variable is independent of all variables except its descendents. Thus, only the parents of the target variable should be used in the regression function. Since the cardinality of the parent set would typically be less than the total number of variables in the dataset, the accuracy of the regression function is significantly improved for given amount of data.

In view of this, in an alternative the system 300 may employ fewer training data-points with the regression function and still achieve target accuracy. As the time complexity for the KR method is $O(kn^3)$, with k variables and n points in the training dataset, the system 300 may achieve significant computational speedup.

In an existing real world content distribution system, the density of the dataset of a real deployment may be highly irregular. For instance, there may be numerous points in regions of space that represents normal network operation, while the density of data is sparser in regions that represent fringe cases. Unfortunately, because the underlying principle of most regression techniques is to find parameters that minimize the errors on the training data, one may end up with parameters that minimize the error for high density regions of the space but give poor results in fringes. This problem is known as overfitting.

A typical solution to this problem involves introducing a smoothness penalty in the objective function of the regression method. However, finding the right penalty function requires cross-validation, which is usually at least quadratic over the size of the global dataset. The system may use techniques such as those disclosed in "'N-Body' Problems in Statistical Learning" by Gray and Moore, pp. 521-527 in Advances in Neural Information Processing Systems 13, published by MIT Press, 2001, the entire disclosure of which is hereby expressly incorporated by reference herein.

In the case of an exemplary content distribution network, a dataset containing even one day's worth of data may contain entries for hundreds of millions of requests, making the quadratic complexity in size of the dataset mathematically challenging. In accordance with an aspect of the present invention, one way to tackle this problem is to use piecewise regression, whereby the space is divided into small regions, referred to herein as tiles, and perform regression independently for each.

A system in accordance with aspects of the invention may further prune the global dataset to produce a training dataset so that the density of training points is more or less even across all the tiles. To decompose the space, the system may use a technique similar to kd-trees as disclosed in "Computational Geometry: An Introduction" by Preparata et al, copyright 1985 by Springer-Verlag, the entire disclosure of which is hereby expressly incorporated by reference herein. However, instead of dividing data on the median, the system may use fixed-size buckets for each dimension in the dataset for most of the space. If the bucket sizes are sufficiently small, having more data points beyond a certain threshold does not contribute appreciably to the response time prediction accuracy.

In view of this, the system may use two thresholds, namely $n_{min}$ and $n_{max}$, and proceed with tile boundaries as follows. By way of example only, the system may decide on a bucket width $b_i$ along each dimension i, and form boundaries in the space of the dataset at integer multiples of $b_i$ along each dimension.

For categorical variables, the system may use each category as a separate bucket. For each tile, the system may obtain a uniform random subset of $n_{max}$ points from the global dataset and adds it to the training dataset. If the dataset has fewer than $n_{min}$ data-points, the system may fold the tile boundaries to merge it with neighboring tile. This process may be repeated until the tile has $n_{min}$ number of points. Those points may then be added to the training data.

Figure 8:
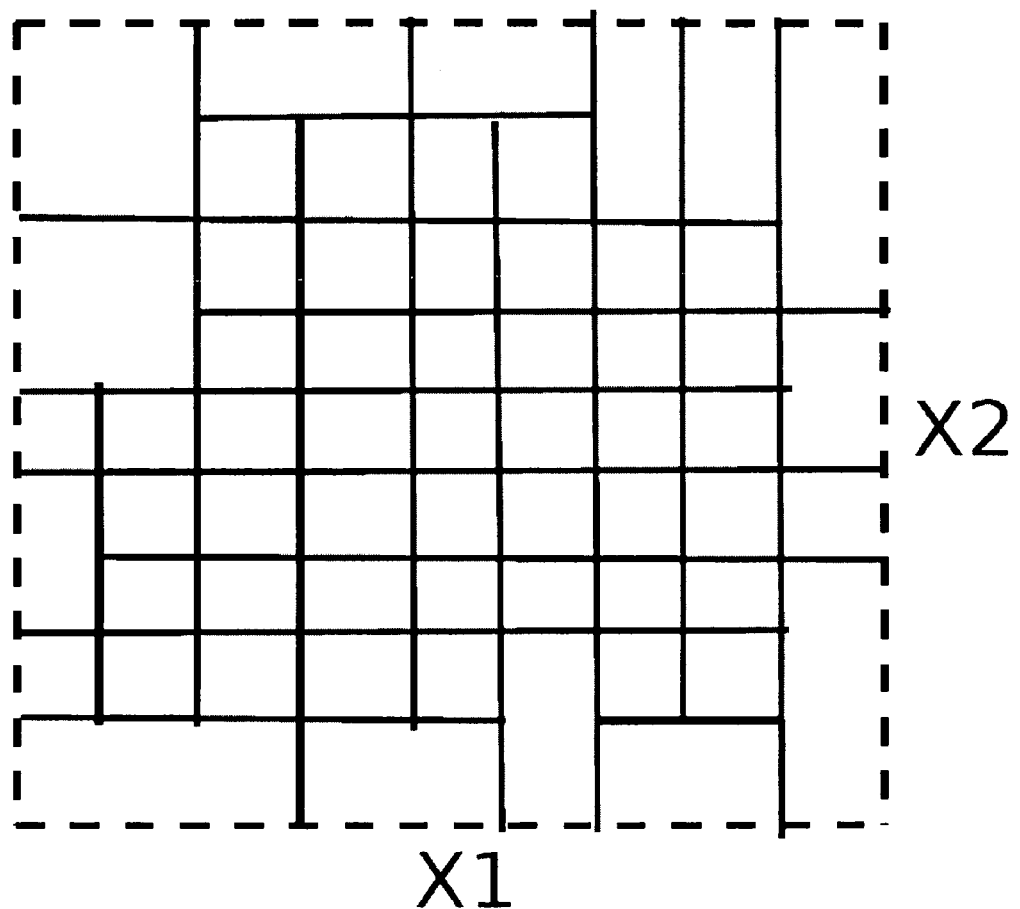
FIG. 8 illustrates a 2-D tile arrangement in accordance with aspects of the present invention.

The result is a decomposition where most of the tiles have regular boundaries. However, for some tiles, especially those on the fringes, the boundaries can be irregular as shown in FIG. 8 (for a 2D space). Once preparation of the training data is complete, the system may use cross validation to come up with regression parameters for each tile, which may now be only $O(n^2_{max})$ for each tile.

With large datasets, even mundane tasks, such as retrieving training and test data during the input distribution preparation and response-time estimation phases may be challenging. Quick data retrieval and processing is important because both of these stages may be online or active, in the sense that they are evaluated when the designer specifies the scenario.

In accordance with an aspect of the present invention, the system may fetch data quickly by intelligently indexing the training data off-line and the test data as it is created. The concept of tiles may be used here as well. By way of example only, each tile may be assigned a tile-id, which may be the concatenation of tile's boundaries in each of the dimensions, with all data points that lie in the tile boundaries being assigned the tile-id as a key that is used for indexing.

For the data preparation stage, the system may perform tile-id assignment and indexing along the dimensions comprising the parents of most commonly used variables. For the regression phase, the tiling and indexing may be performed for the dimensions comprising the parents of the target variable. As the tile-ids may use fixed length bins for most of the space, mapping of a point to its space can be performed in constant time for most of the data-points using simple arithmetic operations.

When dealing with large amounts of data and computations, it may be beneficial to design the system such that it is parallelizable and that tasks which require the same or similar data can be batched so as to reduce any I/O overhead. Various stages in scenario evaluation according to aspects of the present invention may be designed to support both parallelization and batching.

For instance, in the training data preparation stage, each entry in the dataset may be assigned the tile-id based key independent of other entries because of the use of regular sized tiles. Similarly, the parameters for regression for each tile may be learned independently and in parallel. In the input data preparation stage, all of the test data that falls within a tile may be batched and the data may be fetched from the training data for all of these together. And when using piecewise regression for estimating the overall distribution, the system may allow batching of all the test data that falls in a tile as well as the training data for the tile, and further all the piecewise computations can take place in parallel, since they are independent.

In one example, a system in accordance with aspects of the present invention may be implemented using a Map-Reduce framework using the Sawzall logs processing language and Python Map-reduce libraries. Details of the Map-Reduce framework may be found in "MapReduce: Simplified Data Processing on Large Clusters" by Dean and Ghemawat, from Proc. OSDI'04: Sixth Symposium on Operating System Design and Implementation, December 2004, the entire disclosure of which is hereby expressly incorporated by reference herein. Details of the Sawzall logs processing language may be found in "Interpreting the Data: Parallel Analysis with Sawzall" by Pike et al, Scientific Programming Journal—Special Issue on Grids and Worldwide Computing Programming Models and Infrastructure, in volume 13, issue 4 of Scientific Programming, the entire disclosure of which is hereby expressly incorporated by reference herein. The Hadoop environment supported by the Apache Software Foundation may also be used with a Map-Reduce framework.

In this example, the aforementioned framework may be used to exploit parallelization and batching opportunities offered by the system. In one alternative a Python front-end node and a MySQL backend node may be used for small scale datasets.

Figure 9A:
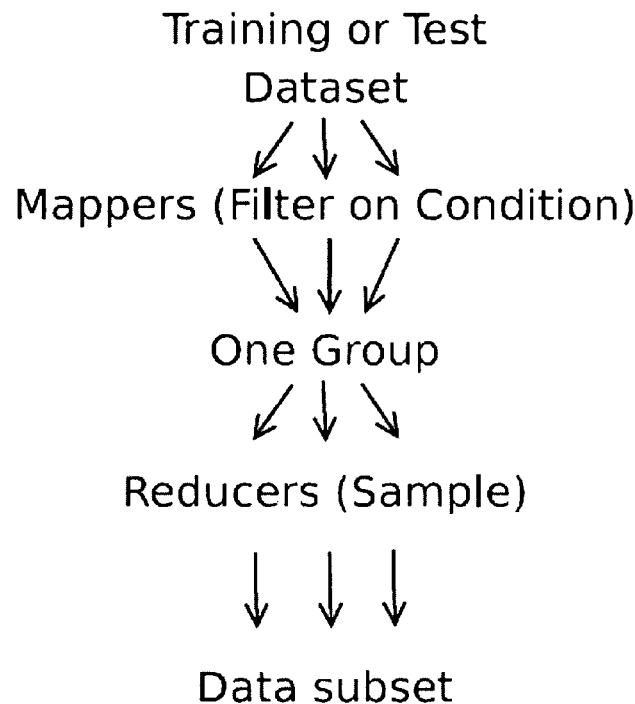
FIGS. 9A-D illustrate map-reduce patterns in accordance with aspects of the present invention.
Figure 9B:
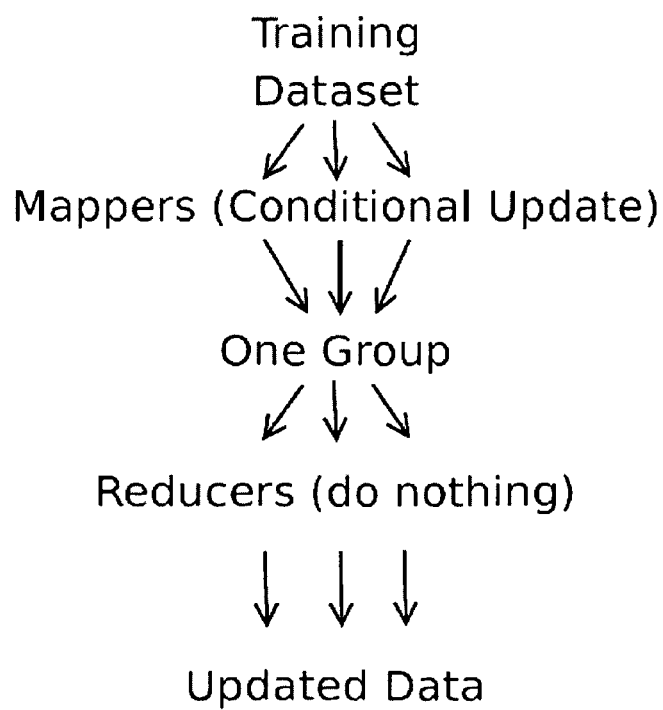
Figure 9C:
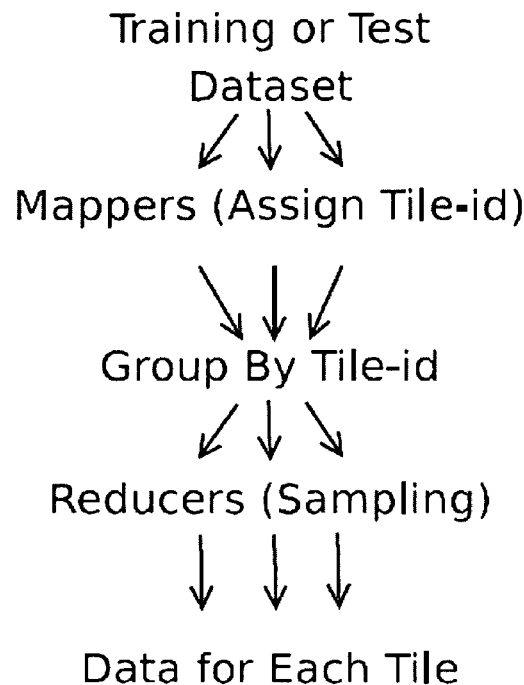
Figure 9D:
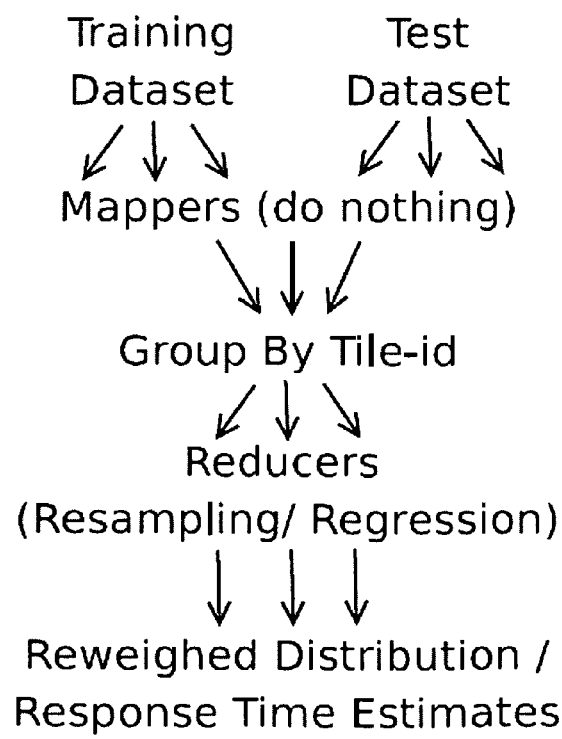

Many processes in accordance with aspects of the present invention are implemented using a combination of one or more of the four Map-Reduce patterns shown in FIGS. 9A-D. FIG. 9A illustrates an exemplary filter pattern. FIG. 9B illustrates an exemplary update pattern. FIG. 9C illustrates an exemplary tile-ID assignment. And FIG. 9D illustrates exemplary training and test data collation.

Specific mapper and reducer routines in each of these patterns may be implemented as either Sawzall or Python scripts. A Map-Reduce based implementation may evaluate typical scenarios in about 5 minutes on a cluster of 50 PCs while dealing with nearly 500 GB of training data. The majority of this time may be spent in setting up the job on the distributed computation platform for a Map-Reduce implementation.

Figure 10:
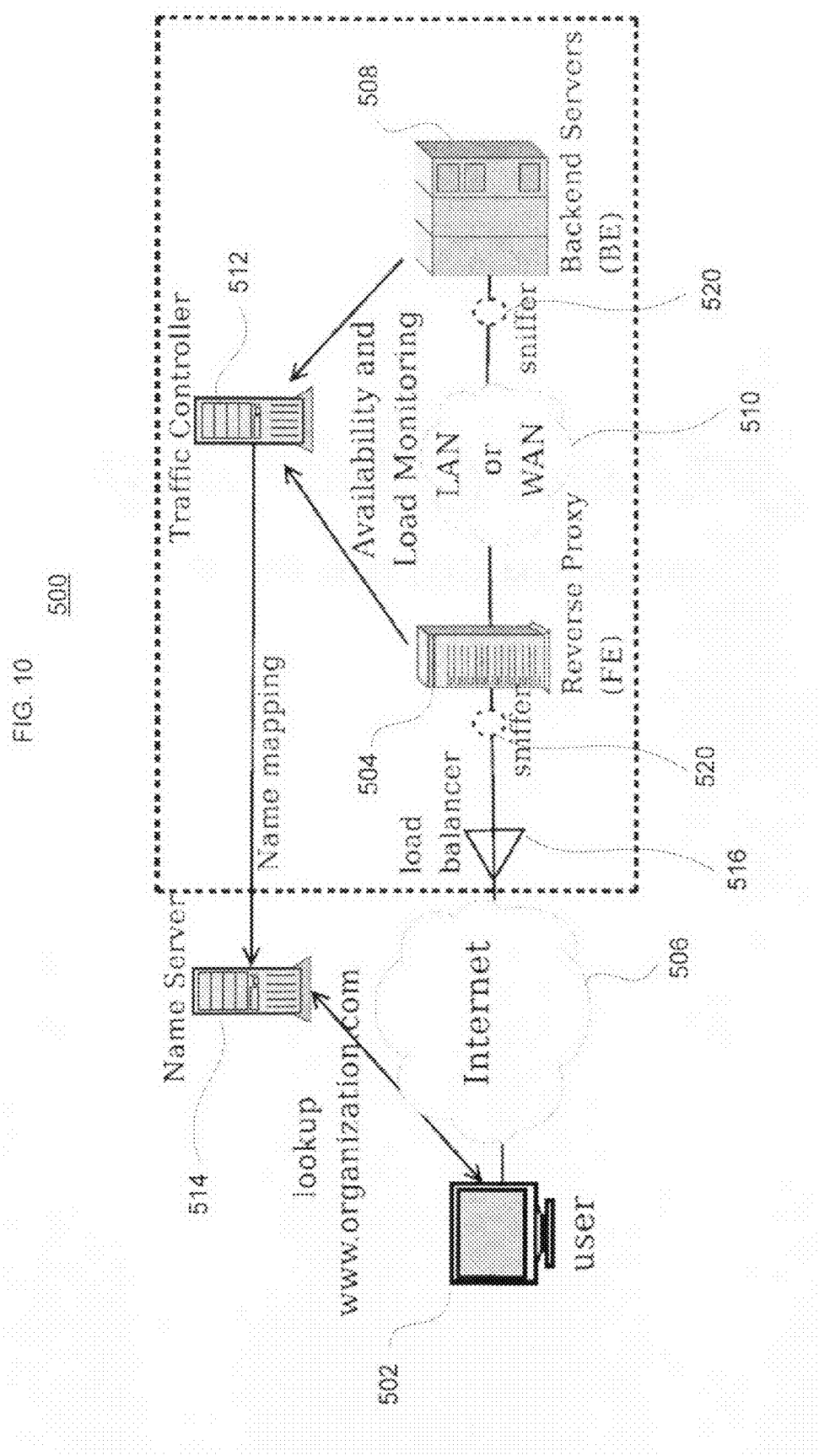
FIG. 10 illustrates another exemplary network in accordance with aspects of the present invention.

FIG. 10 illustrates an exemplary web search service architecture 500 in accordance with aspects of the present invention. The architecture 500 resembles the two-tier architecture shown in FIG. 2.

The service architecture 500 a user node 502 which may support one or more users. The architecture also includes a system of globally distributed HTTP reverse proxies, FE 504, which are coupled to the user node 502 via network 506 such as the Internet. The architecture also includes a system of globally distributed clusters that house the Web servers and other core services such as index and document services, identified as BE node 508, which is coupled to FE node 504 via a network 510 such as a LAN or WAN.

A DNS based request redirection system, including one or more of traffic controller 512, name server 514 and/or load balancer 516 may redirects the user's query to one of the FEs 504. A first sniffer 518 may be placed between the load balancer 516 and the FE node 504. And a second sniffer 520 may be placed between network 510 and BE node 508. As referred to herein, a "sniffer" includes a device or program that may read the packets that are traversing an interface and display or store them. The sniffers 518 and 520 may collect the traffic information, which forms the input dataset for the system. The FE 504 forwards the query to the BE node 508, which may generate dynamic content based on the query. The FE 504 may cache static portions of typical reply and start transmitting that part to the requesting user at node 502 as FE 504 waits for a reply from the BE 508.

Once the BE 508 replies, the dynamic content is also transmitted to the user. The FE node 504 may or may not be co-located with the BE node 508 in the same data center. If they are co-located, they can be considered to be connected on a LAN and the network round-trip time between these entities may be estimated to be only a few milliseconds.

Otherwise, the connectivity between the FE node 504 and the BE node 508 may be analyzed as a well provisioned connection on the public Internet. In this case, the latency between the FE node 504 and the BE node 508 may be several hundred milliseconds or more. In this example, the server response-time for a request is the time between the instance when the user issues the HTTP request to the instance that the last byte of the response is received by the users. This value may be estimated as the sum of the round-trip time estimate obtained from the TCP three-way handshake and the time between the instance when the request is received at the FE node 504 and when the last byte of the response is sent by the FE node 504 to the user.

It has been discovered that important contributors to server response time include (i) transfer latency of the request from the user to the FE; (ii) transfer latency of the request to the BE and the transfer latency of sending the response from the BE to the FE; (iii) processing time at the BE; (iv) TCP transfer latency of the response from the FE to the client; and (v) any latency induced by loss and retransmission of TCP segments.

Figure 11:
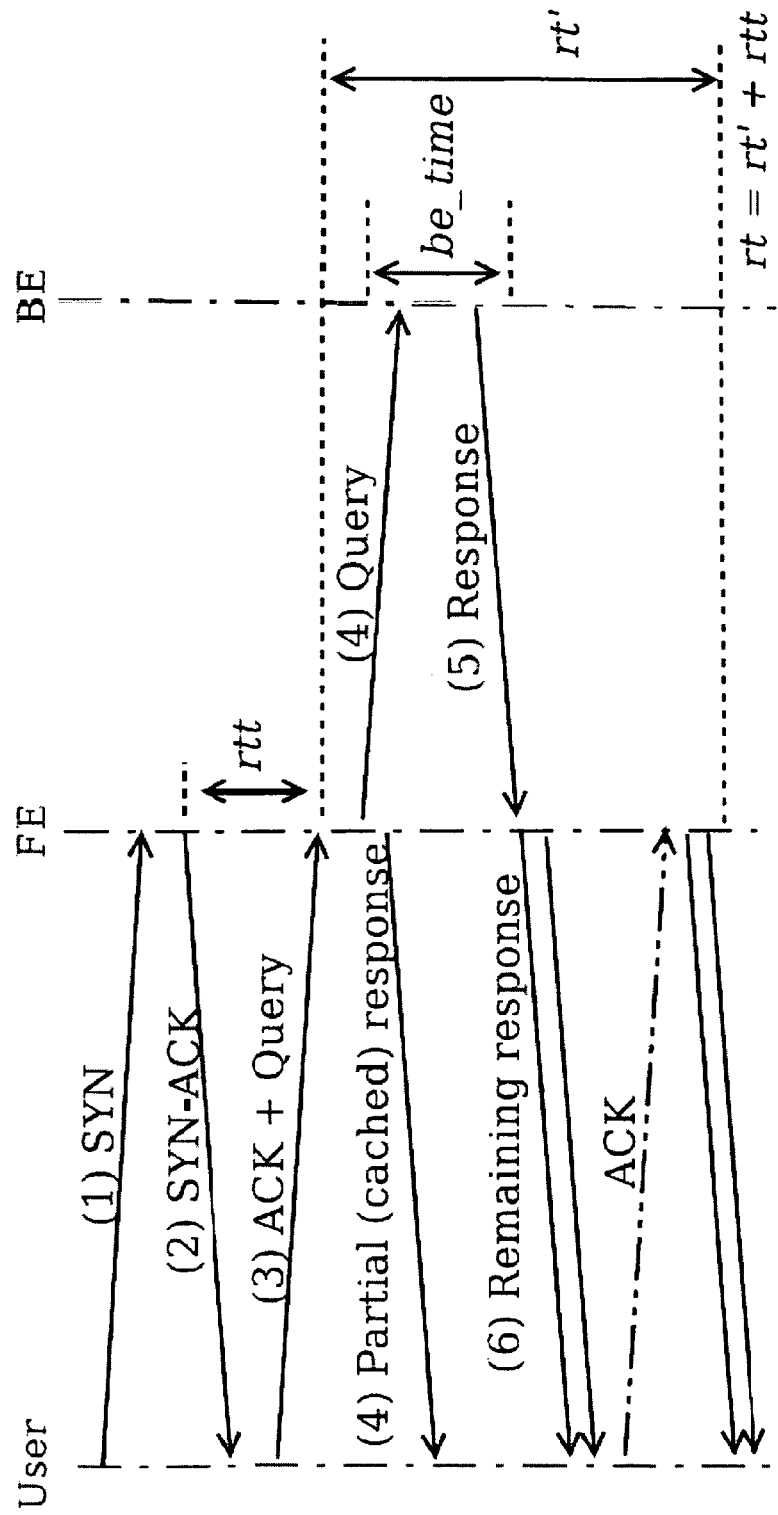
FIG. 11 illustrates an exemplary search query in accordance with aspects of the present invention.

FIG. 11 shows an exemplary process 600 by which a user's Web search query is serviced with the architecture 500. As shown, the message exchange includes three issues that affect service response-time in subtle ways, making it hard to make accurate "back of the envelop calculations" in the general case. These features are (1) asynchronous transfer of content to the user; (2) spliced TCP connections; and (3) spurious retransmissions and timeouts.

With regard to the first issue, once the TCP handshake is complete, the user's browser sends an HTTP request containing the query to the FE node 504. While the FE waits on a reply from the backend, it sends some static content to the user. This content, essentially a "head start" on the transfer, may be brief and constitutes only a couple of IP packets. Once the FE node 504 receives a response from the backend, it sends the response to the client and completes the request. A client may use the same TCP connection for subsequent HTTP requests.

With regard to the second issue, the FE node 504 may also use TCP to communicate with the BE node 508. However, for efficiency reasons the FE node 504 may keep several TCP connections alive with the BE node 508 and reuse these connections for forwarding user requests to the backend. The FE node 504 may also support HTTP pipelining, allowing the user to have multiple pending HTTP requests on the same TCP connection.

And as to the third issue, because most Web requests are short TCP transfers, the duration of the connection is not sufficient to estimate a good value for the TCP retransmit timer. Thus, many Web servers use default values for retransmits or estimate the timeout value from the initial TCP handshake roundtrip time. Unfortunately, this may cause spurious retransmits for users with slow access links and high serialization delays for MTU sized packets.

In accordance with an aspect of the present invention, the system may use data from an existing network monitoring infrastructure in an organization's network (e.g., a CDN). Each FE node 504 may have one or more network-level sniffers 518 located between the FE node 504 and the load balancer(s) 516 to capture traffic and export streams in tcpdump format.

A similar monitoring infrastructure such as sniffer(s) 520 may capture traffic at the BE node 508. The system may collate the traces from the front-end and backend and process the traces to collect several features for each Web transaction for the search service. The features may be used to form the variables in the dataset. The system, such as system 300, may then apply the relevance tests on the dataset.

In one exemplary embodiment, a primary metric for system evaluation is prediction accuracy. In this example, there are two sources of errors in response-time prediction. The first is error in a response-time estimation function. The second is inaccurate input, or error in estimating a valid input distribution that is representative of the scenario.

To isolate these two types of errors, one may first evaluate the estimation accuracy alone and later consider the overall accuracy for complete scenarios. To evaluate response-time function estimation accuracy in isolation, one may try to evaluate a scenario such as what if no changes are made to the network. This kind of scenario may be easily specified when using the scenario specification language by not including any optional scenario update statements.

For instance, an exemplary scenario including only the following specification: "USE WHERE country==ABC" would result in a input distribution for the response-time estimation function that is representative of users in country ABC without any error. In accordance with aspects of the present invention, two such scenarios have been tested. In this example testing was conducted on content distribution networks configurations in two countries, namely Germany and South Africa with the following scenario specifications: (a) USE WHERE country=deu; (b) USE WHERE country=zaf. Another test was conducted for the scenario where the front end node was located in Japan, using the following specification: USE WHERE fe=jp.

The first two scenarios specify estimating the response-time distribution for the users in Germany and South Africa respectively (deu and zaf are country codes for these countries in our dataset). The third scenario specifies estimating the response-time distribution for users that are served from a front end node in Japan.

In order to evaluate each scenario, a baseline or training dataset was first collected for each one. In this case, a training dataset containing a week's worth of data was collected for each scenario. Then in accordance with aspects of the present invention, modules such as disclosed above with regard to FIG. 4A performed an analysis and resultant predicted response time in view of the input scenario, relevant features and their dependencies. Normalized response time distributions were generated by, e.g., output module 310, for each scenario. These normalized response time distributions compared the predicted response time with the actual response time for a subsequent week's operation.

Figure 12A:
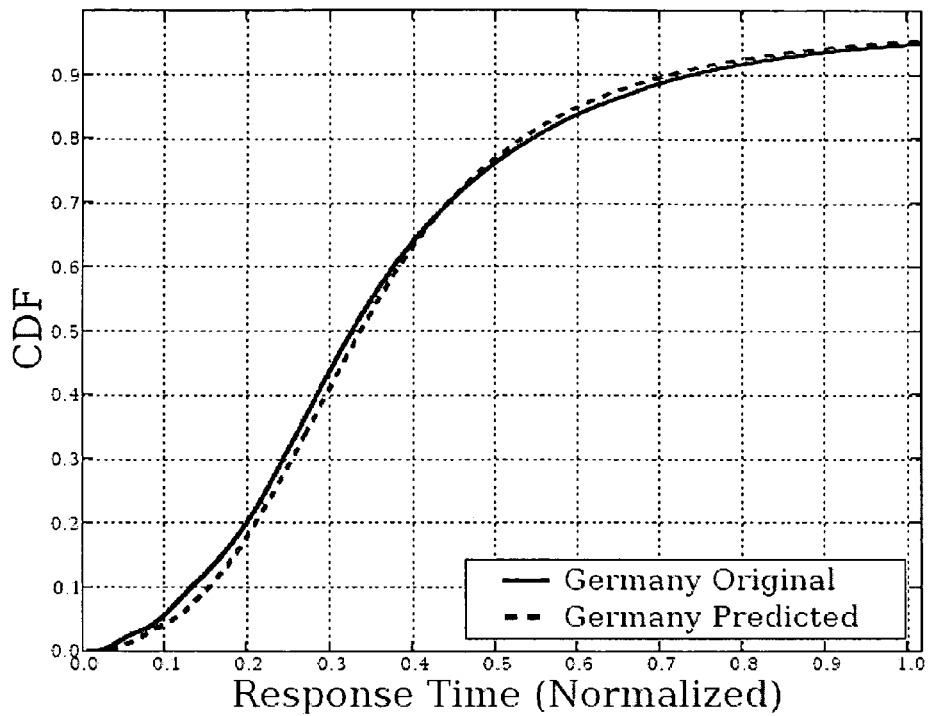
FIGS. 12A-C illustrate cumulative distribution functions in accordance with aspects of the present invention.
Figure 12B:
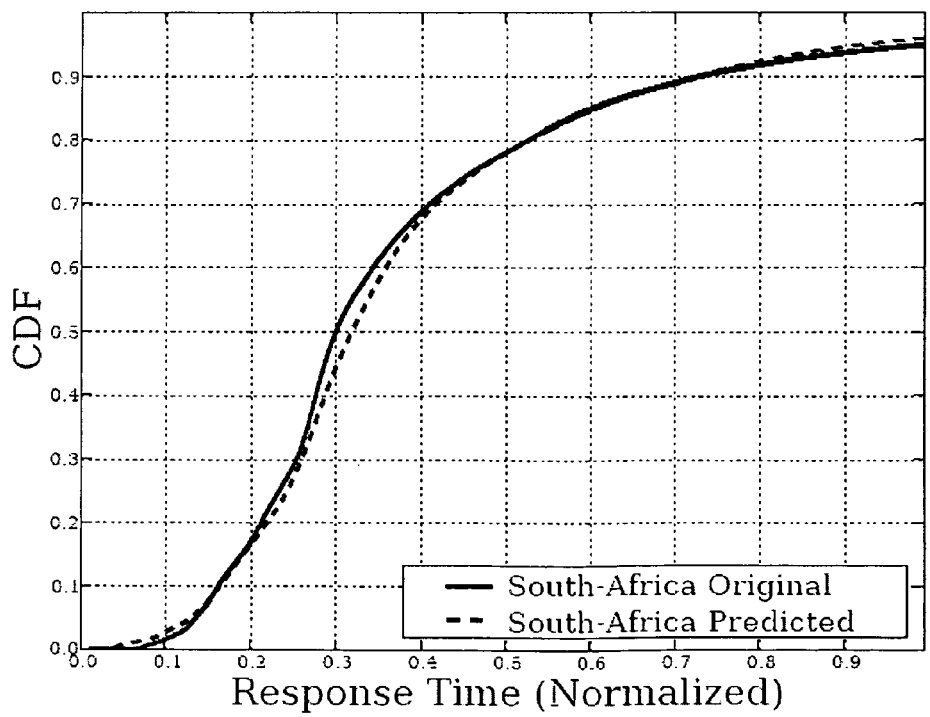
Figure 12C:
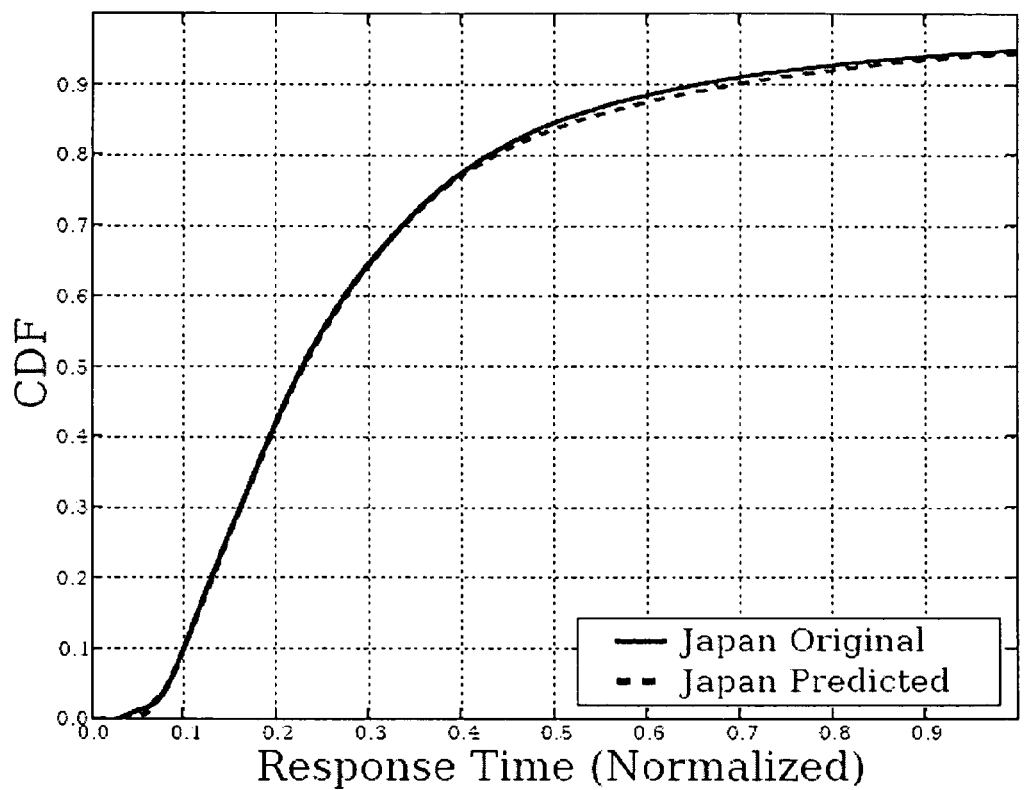

FIGS. 12A-C present the results for the three scenarios, respectively. The "ground truth" distribution for response-time based on real response-time values observed by the monitoring infrastructure, such as sniffers 518 and 520 of FIG. 10, is shown by the solid line in each figure. The predicted response-time distribution for the same period is shown as a dotted line in each respective figure.

Figure 13:
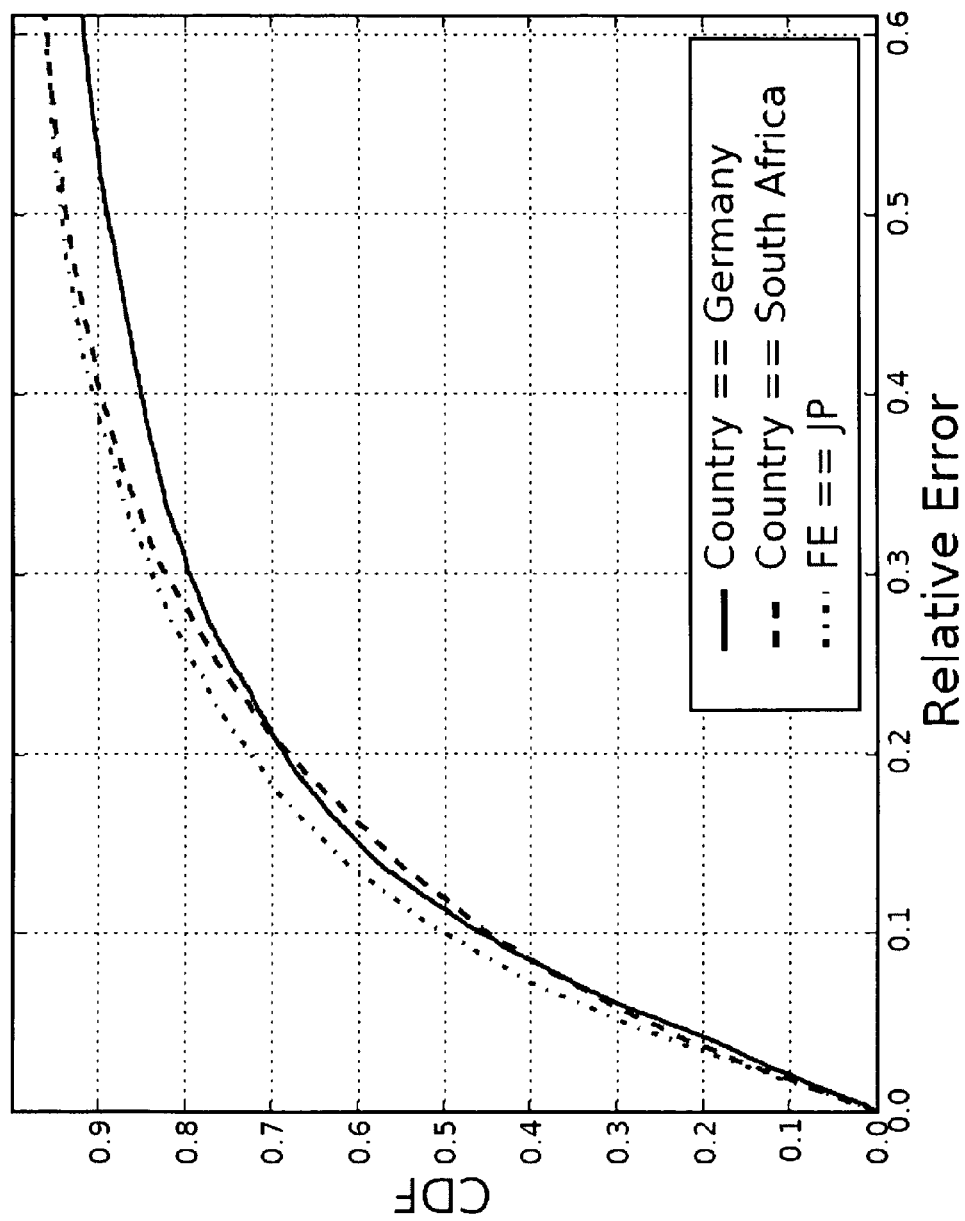
FIG. 13 illustrates a comparison of several cumulative distribution functions in accordance with aspects of the present invention.

As shown in each figure, the predicted response time tracks the actual response time very closely in each case. This may also be seen in FIG. 13, which illustrates the normalized relative prediction error for each scenario. In this example, the relative prediction error is defined as $|rt-(\hat{rt})|/rt$. Here, rt is the observed value and $(\hat{rt})$ is the predicted value for the response-time. As shown, the median error ranges between 8-11%.

The above response time scenarios show predicted results which track the actual results very closely. Another scenario of interest was discussed above with regard to FIGS. 1A and 1B, namely the swapping from one front end node 104 to a second front end node 104'. Real-world testing of such as case shows that, in accordance with an embodiment of the present invention, a system such as system 300 can not only predict the distribution for response-time very accurately, but also predicts the distribution for intermediate variables accurately.

To appreciate the complexity of this scenario, consider what happens "on the ground" during such a reconfiguration change. When FE node 104' is co-located with BE node 108, the febe_rtt (network level round trip time between front end node and back end node) reduces to an intra-data center roundtrip latency on the order of 3 ms. It has also been observed that the average latency to the FE node 104' for customers at customer node 102 increased by about 135 ms as they were served from original FE node 104.

A system such as system 300 may use a CBN to automatically update the scenario distribution. Because the fe variable is changed (from FE node 104 to FE node 104'), the system updates the distribution of children of the fe variable, which in this case may include the febe_rtt and rtt variables. This, in-turn, causes a change in children of the rtt variable, and similarly, the change cascades down to the rt variable in the directed acyclic graph such as shown in FIG. 5.

Figure 14A:
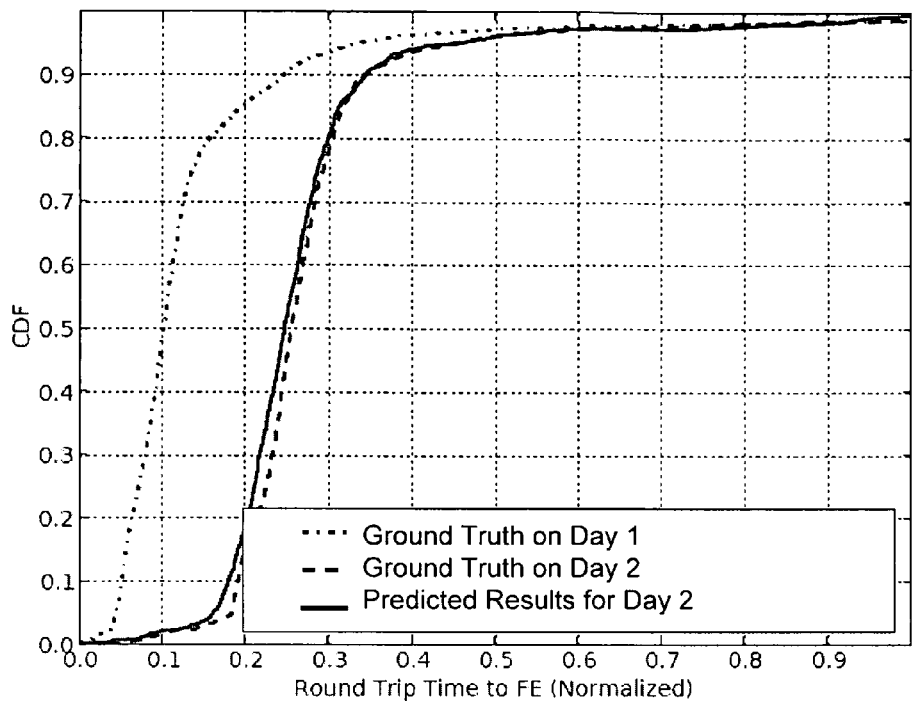
FIGS. 14A-C illustrate other cumulative distribution functions in accordance with aspects of the present invention.
Figure 14B:
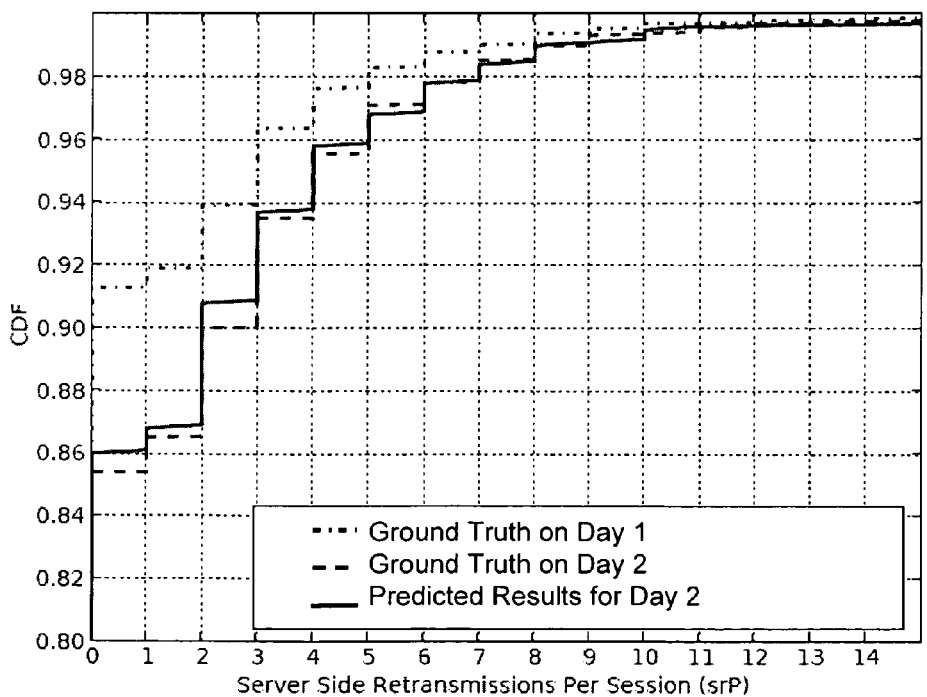
Figure 14C:
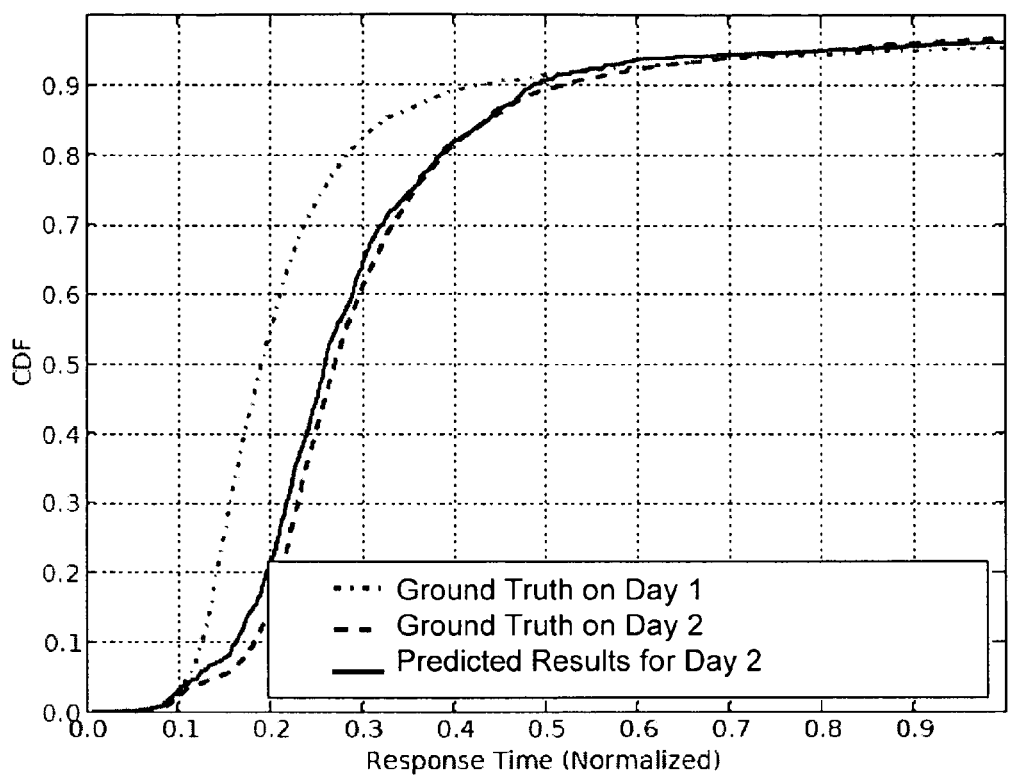

In one example, ground truth data was collected on two consecutive days and predictions on the operational impact of a change to the FE node was made for the second day. FIGS. 14A-C illustrate ground truth and predicted response-time distributions as well as distributions for intermediary variables in this case. As shown by the plots in these figures, there is a minimal under-estimation of the predicted distributions for day 2, even though the ground truths for day 2 differed significantly from the ground truths for day 1 for each variable. One possible reason for the predicted variance is insufficient training data to evaluate the variable distribution for the peripheries of the input distribution. For instance, the system was unable to predict response-time for roughly 2% of the requests in the input distribution.

Overall, as shown the maximum cumulative distribution differences for the distributions of the three variables were between 7-9%. Given that the designer need only specify a rough point estimate for the change in network round-trip time, the predicted results are highly accurate. Even in the situation where the front end load is initially shared between FE node 104 and FE node 104' before changing over solely to FE node 104', a network designer or other user could still evaluate the scenario by directly specifying the expected numerical changes in the rtt values.

In another example in accordance with aspects of the present invention, a small scale emulated web service environment was employed using an Emulab testbed. Details of which may be found at www.emulab.com. Emulab provides an experimental testbed that allows researchers to temporarily create networked environments of a specified design. The networks comprise a set of computers and interconnecting equipment (e.g., links, routers and switches) which may be tested in accordance with the researchers' test criteria.

Figure 15:
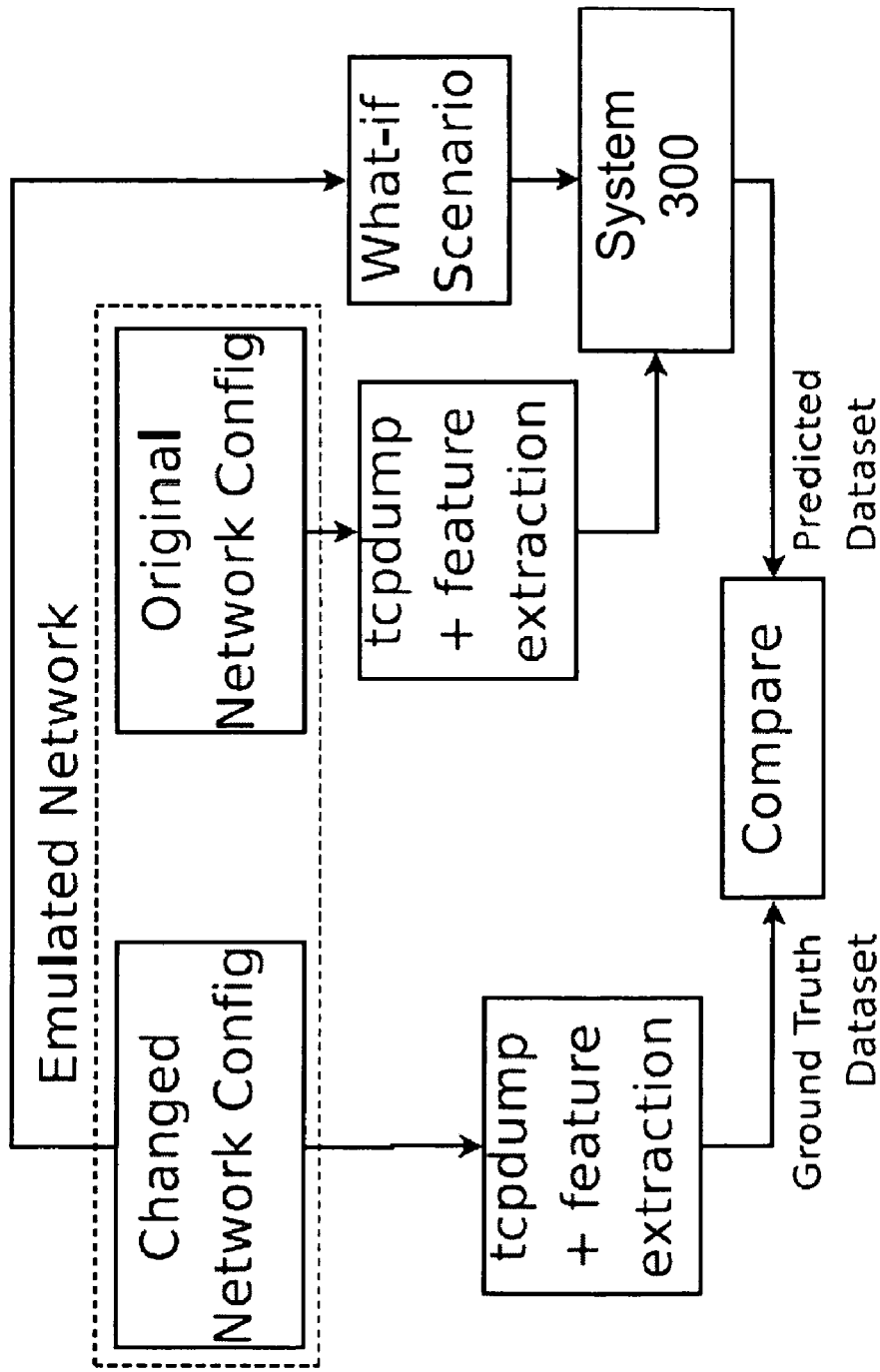
FIG. 15 illustrates an exemplary controlled experiment setup in accordance with aspects of the present invention.

In this example, the environment employed a host running an ApacheWeb server as a BE node, a host running a Squid Web proxy server as a FE node, and a host running a multi-threaded wget-based Web client that issued request at an exponentially distributed inter-arrival time of 50 ms. The configuration also includes delay nodes using dummynet (see, e.g., www.dummynet.com) to control latency. FIG. 15 illustrates a logical view of the controlled experiment setup. This figure illustrates inputs into an exemplary predictive system such as system 300 discussed above, as well as comparison of the predicted output to a ground truth dataset.

To emulate realistic conditions, a one day trace was used from several data centers in an operation content distribution network. This was done to configure the resource size distribution on the BE as well as to emulate the wide area round-trip time on the delay node.

For each experiment tcpdump data was collected for approximately two hours. The tcpdump data was processed to extract a feature set similar to one described in Table 1 infra. Losses and retransmits were not specifically emulated because these occurred for less than 1% of the requests in the content distribution network.

By way of example only, two what-if scenarios were conducted in this environment. The first involved a change in resource size. This experiment involved just the BE and the client machine, and used the delay node to emulate wide area network delays. Initially, data was collected using a resource size distribution based on the real trace for about two hours. This dataset was used as the training dataset.

For the what-if scenario, all of the resources on the BE were replaced with resources that were half the size. The training dataset was collected for another two hours. The system 300 was then used to estimate the response-time distribution for the later scenario by using a "INTERVENE SET FIXED sB/=2" statement in a scenario specification.

Figure 16A:
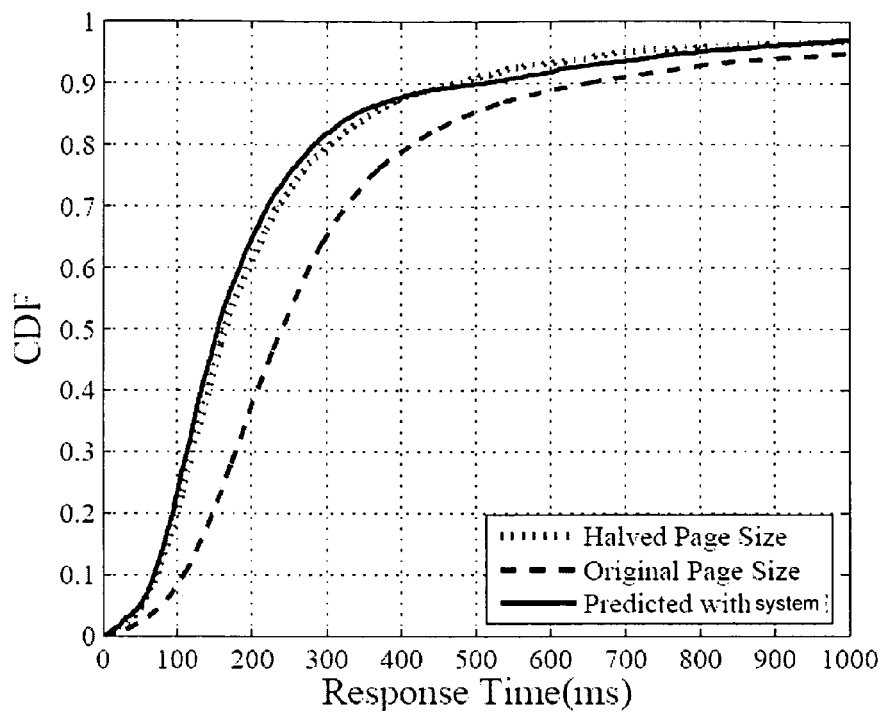
FIGS. 16A-B illustrate additional cumulative distribution functions in accordance with aspects of the present invention.

FIG. 16A shows a plot of the CDF for a response-time distribution for the original page size (dashed line), the observed response-time distribution with halved page sizes (dotted line), and the response-time distribution for the what-if scenario predicted with an exemplary system using the original page size based dataset as input (solid line). As shown, the maximum CDF distance in this case is only about 4.7%, which occurs around 40th percentile.

The second scenario involved changing the cache hit ratio. For this experiment, a host running a Squid proxy server was introduced to the network and configured to cache 10% of the resources uniformly at random. A delay node existed between the client and the proxy as well as between the proxy and the BE server. The delay nodes were used to emulate trace driven latency as before in the previous experiment.

For the what-if scenario, the Squid proxy was configured to cache 50% of the resources uniformly at random. To evaluate this scenario, a binary variable ("b_cached") was used for each entry in the dataset that indicated whether the request was served by the caching proxy server or not. Approximately 3 hours of trace was used with 10% caching as the training dataset.

The exemplary system was used to predict the response time distribution for the case with 50% caching by using an "INTERVENE SETDIST b_cached FILE 50 pcdist" statement in the scenario specification. Here, the SETDIST directive tells the system, e.g., modules 304, 306 and/or 308, to update the b_cached variable by randomly drawing from the empirical distribution specified in the file, which in this case contains 50% 1s and 50% 0s as a result of the 50% of the requests are intervened to have cached response.

Figure 16B:
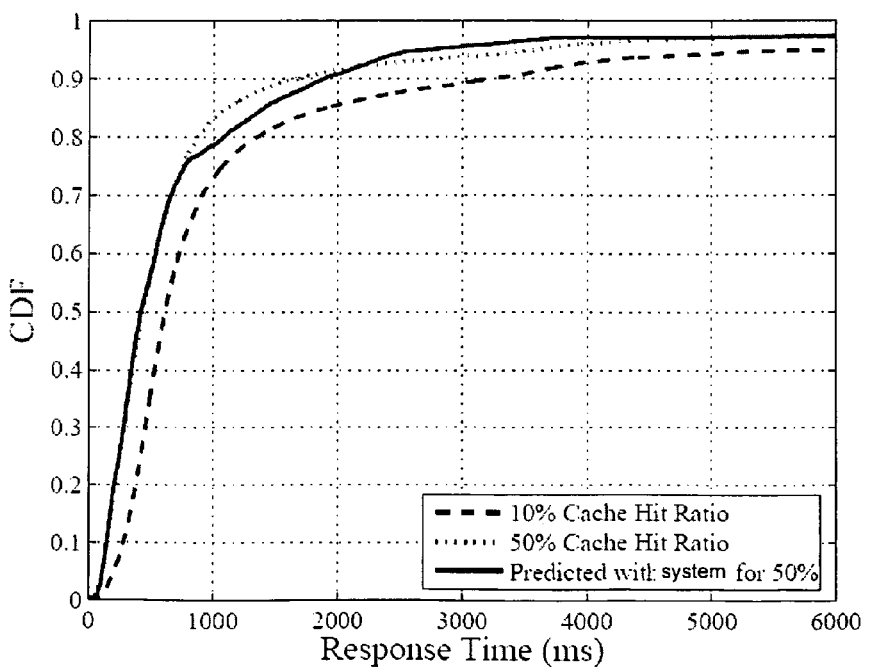

FIG. 16B shows a normalized CDF for a response-time distribution for a 10% cache-hit ratio (dashed line), the response-time distribution with a 50% cache-hit ratio (dotted line), and the response-time distribution for the 50% caching predicted with the exemplary system using the original 10% cache-hit ratio based dataset as input (solid line).

As shown, the system predicted the response-time very accurately for up to the $80^{th}$ percentile, with some deviation for higher percentiles. One explanation for this occurrence is because the training dataset did not contain sufficient data for some of the very large resources or large network delays. The maximum CDF distance in this case was 4.9%, which occurred around the 79th percentile.

The class(es) of what-if scenarios that can be evaluated in accordance with aspects of the present invention depends entirely on the dataset that is available. In one embodiment, the system may have two requirements for the dataset. First, the what-if scenario may be expressed in terms of variables that define the dataset and manipulation of those variables.

At times it is possible for dataset to capture the effect of the variable without capturing the variable itself. In such cases an exemplary system may not evaluate a scenario that requires manipulation of a hidden variable. For example, the dataset may not include the TCP timeout variable even though this variable has an effect on response time. In this case the exemplary system would not be able to accurately evaluate a scenario that requires manipulating the TCP timeout value.

Second, the exemplary system may also require that the dataset contain values of variables that are similar to the values that represent the what-if scenario. If the global dataset does not have sufficient points in the space where the manipulated values of the variables lie, it may generate warnings while evaluating the scenarios.

An exemplary system may also make stability assumptions. In other words, causal relationships would remain valid under any values of intervention and the underlying behavior of the system that determines the response-times would not change. This assumption is reasonable as long as the fundamental protocols and methods that are used in the network continue to remain the same.

In another situation, an exemplary system may use the assumption of functional dependencies among variables to update the values for the variables during the statistical intervention evaluation process. In the present case, such a system may only rely on non-parametric techniques for updating the variables. However, nothing in the system framework would prevent using parametric functions.

Furthermore, if the dependencies among some or all of the variables are parametric or deterministic, then the system's utility may be improved. By way of example only, such a situation can in some cases allow extrapolation to predict variable values outside of what has been observed in the training dataset.

In alternate embodiment, what-if scenarios may be applied to other networking realms. For instance, other realms such as routing, policy decisions, and security configurations may be augmented with reasoning systems with a decision evaluation system.

Embodiments of the present invention may also be used to evaluate scenarios which may depend on features that are outside of a given CDN. This may be done, for instance, by augmenting the datasets with information such as latency on Internet paths. Alternatively, such datasets may be augmented by using techniques such as disclosed in "iPlane: An Information Plane for Distributed Services," by Madhyastha et al, found in OSDI 2006, November 2006, and "A Structural Approach to Latency Prediction," by Madhyastha et al, found in ACM/USENIX Internet Measurements Conference, copyright 2006, the entire disclosures of which are hereby expressly incorporated by reference herein.

In accordance with aspects of the present invention, embodiments of systems and methods for specifying and accurately evaluating what-if deployment scenarios for content distribution networks have been provided. Testing and evaluation demonstrate that systems implementing the aforementioned methods are both fast and accurate. By way of example only, response time distributions can be predicted for a what if scenarios within a 15% error margin or less. An exemplary user interface, such as the scenario specification language or a GUI, makes it easy for the user to specify complex configurations in just a few lines of code.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A method of predicting a service criterion in a distributed computer network, the method comprising:
    collecting a set of features about at least one of requests and responses that arrive at an input of the network;
    collecting a set of data associated with the requests or responses, the data set including at least one of network data and system data;
    determining a subset of the features which are relevant based upon the collected data set;
    learning dependencies between features of the subset;
    specifying a scenario associated with the service criterion of the network, the scenario including one or more conditions;
    preparing an input distribution, including:
        filtering the collected data set based on the conditions specified in the scenario, and;
        executing subsequent requirements in the scenario specification such that the data set is updated to be consistent with both the specified conditions and the dependencies among the subset of features; and
    outputting a predicted data set for evaluating expected operation of the scenario based on the input distribution.

2. The method of claim 1, wherein specifying the scenario includes identifying changes to values of the features of the subset.

3. The method of claim 1, wherein specifying the scenario includes receiving a use parameter and at least one scenario update parameter.

4. The method of claim 3, wherein the use parameter specifies a condition that describes a subset of the network.

5. The method of claim 4, wherein the use parameter specifies the subset of the network based on a location of one or more client devices.

6. The method of claim 4, wherein the use parameter specifies the subset of the network based on a location of at least one network server.

7. The method of claim 4, wherein the use parameter specifies the subset of the network based on properties of a service session.

8. The method of claim 3, wherein the at least one scenario update parameter represents values for one or more of the subset of features.

9. A system for predicting a service criterion in a distributed computer network, the system comprising:
    a scenario input module for receiving a what-if scenario from a user, the what-if scenario identifying a use parameter and at least one scenario update parameter associated with the network;
    a relevant feature module for receiving a dataset of features associated with the network and for determining which ones of the features of the dataset are relevant to the what-if scenario;
    a dependencies module for identifying which ones of the relevant features have parent or child dependencies to other ones of the relevant features;
    an input distribution module for filtering data associated with the relevant features and for executing subsequent requirements in the what-if scenario;
    a processor for managing operation of the scenario input module, the relevant feature module, the dependencies module and the input distribution module; and memory for storing instructions and data for execution by the processor, the scenario input module, the relevant feature module, the dependencies module and the input distribution module.

10. The system of claim 9, wherein the input distribution module filters the data by re-sampling and re-weighing the data using a causal structure identified by the dependencies module as a guideline.

11. The system of claim 10, wherein the re-sampling and re-weighing is done recursively and if a first relevant feature has a child dependency to a second relevant feature then a distribution of the first relevant feature is not updated until a distribution of the second relevant feature is updated.

12. The system of claim 9, wherein the filtered data forms an initial test dataset and the input distribution module updates the initial test dataset based on values specified in the subsequent requirements of the what-if scenario.

13. The system of claim 9, wherein identifying the parent and child dependencies by the dependencies module includes identifying an undirected graph and orienting edges of the undirected graph.

14. The system of claim 9, wherein identifying the parent and child dependencies by the dependencies module includes identifying which of the relevant features are cause variables and which are no-cause variables.

15. The system of claim 9, wherein identifying the parent and child dependencies employs a causal discovery algorithm.

16. The system of claim 15, wherein the causal discovery algorithm executes a series of instructions using a processor, the series of instruction comprising:
    generating a fully connected undirected graph whereby all nodes representing the relevant features are connected;
    removing edges between nodes that are uncorrelated;
    progressively finding separating nodes between a frontier set of variables from the set of relevant features and all other variables from the set of relevant features; and
    adding the separating nodes to the frontier set.

17. A system for predicting a service criterion in a distributed computer network, the system comprising:
    means for receiving a what-if scenario from a user, the what-if scenario identifying a use parameter and at least one scenario update parameter associated with the network;
    means for receiving a set of features associated with the network and for determining which ones of the features are relevant to the what-if scenario;
    means for identifying which ones of the relevant features have parent or child dependencies to other ones of the relevant features; and
    means for filtering data associated with the relevant features and for executing subsequent requirements in the what-if scenario.

18. A method for determining relevant variables of a distributed computer network, the method comprising:
    obtaining a dataset of variables;
    identifying a first variable of the dataset;
    determining whether the first variable is a categorical variable or a real-valued variable;
    if the first variable is categorical:
        generating a conditional distribution for the first variable, and
        determining whether the conditional distribution of the first variable is statistically similar.

19. The method of claim 18, wherein upon determining whether the conditional distribution of the first variable is statistically similar, the method further comprises:
    discarding the first variable if the conditional distribution of the first variable is statistically similar; and
    storing the first variable in memory if the conditional distribution of the first variable is not statistically similar.

20. The method of claim 18, wherein if the first variable is real-valued, the method further comprises:
    determining whether a correlation satisfies a threshold; and
    if the correlation satisfies the threshold, storing the first variable in the memory.

21. The method of claim 20, wherein if the correlation does not satisfy the threshold, the method further comprises:
    dividing a range of the variable into a series of buckets, wherein each bucket operates as a category;
    generating the conditional distribution for the first variable; and
    determining whether the conditional distribution of the first variable is statistically similar.

22. The method of claim 21, wherein upon determining whether the conditional distribution of the first variable is statistically similar, the method further comprises:
    discarding the first variable if the conditional distribution of the first variable is statistically similar, and
    storing the first variable in memory if the conditional distribution of the first variable is not statistically similar.

23. A method of processing data of a distributed computing network, the method comprising:
    receiving a what-if scenario indicating a change to the distributed computing network, the what-if scenario identifying a use parameter and at least one scenario update parameter associated with the network;
    obtaining a global set of data for the distributed computing network;
    filtering the global dataset to obtain an initial test dataset using the use parameter;
    applying the at least one scenario update parameter to the initial test dataset to obtain an updated test dataset; and
    processing the updated test dataset to output a predicted scenario result to a user.

24. The method of claim 23, wherein the at least one scenario update parameter comprises a plurality of scenario update parameters which are applied sequentially to the initial test dataset.

25. The method of claim 23, wherein the at least one scenario update parameter comprises a plurality of scenario update parameters, at least some of the plurality of scenario update parameters being executed in parallel.

26. The method of claim 25, wherein variables updated for each of the scenario update parameters executed in parallel do not share any common descendents other than a target variable and the updated variables are not descendents of one another.

27. A system for processing data of a distributed computing network, the system comprising:
    at least one processor;
    at least one memory for storing instructions and data for execution by the at least one processor;
    a first module for receiving a what-if scenario indicating a change to the distributed computing network, the what-if scenario identifying a use parameter and at least one scenario update parameter associated with the network;
    a second module for obtaining a global set of data for the distributed computing network and for filtering the global dataset to obtain an initial test dataset using the use parameter; and
    a third module for applying the at least one scenario update parameter to the initial test dataset to obtain an updated test dataset and for processing the updated test dataset to output a predicted scenario result to a user;

wherein the data stored by the at least one memory includes the global dataset, the initial test dataset and the updated test dataset and the instructions comprise module instructions of the first, second and third modules.

28. The system of claim 27, wherein the at least one memory comprises a plurality of distributed memories and the global dataset, the initial test dataset and the updated test dataset are stored among the plurality of distributed memories.

29. The system of claim 28, wherein the at least one processor comprises a plurality of processors, each of the processors being associated with a respective one of the plurality of distributed memories.

30. The system of claim 29, wherein the plurality of processors performs a piecewise regression on the global dataset, each of the plurality of processors performing a regression independently for a given tile to prune the global dataset to obtain the initial test dataset.

31. A method of predicting a service criterion in a distributed computing network, the method comprising:

filtering a collected data set based on at least one condition specified in a network scenario, the collected data set including information associated with network operation;

executing requirements of the specified network scenario to prepare an input distribution so that the collected data set is updated to be consistent with the at least one condition and with dependencies among features associated with the collected data set; and outputting a predicted data set for evaluating expected operation of the network scenario based on the input distribution.

32. An apparatus for predicting a service criterion in a distributed computer network, the apparatus comprising:

a relevant feature module for receiving a dataset of features associated with the network and for determining which ones of the features of the dataset are relevant to a what-if scenario;

a dependencies module for identifying which ones of the relevant features have parent or child dependencies to other ones of the relevant features;

an input distribution module for filtering data associated with the relevant features and for executing subsequent requirements in the what-if scenario; and a processor operable to control execution of the relevant feature module, the dependencies module and the input distribution module.

* * * * *